US011483586B2

(12) United States Patent
Filippov et al.

(10) Patent No.: US 11,483,586 B2
(45) Date of Patent: Oct. 25, 2022

(54) ENCODING APPARATUS FOR SIGNALING AN EXTENSION DIRECTIONAL INTRA-PREDICTION MODE WITHIN A SET OF DIRECTIONAL INTRA-PREDICTION MODES

(71) Applicant: Huawei Technologies Co., Ltd., Shenzhen (CN)

(72) Inventors: Alexey Konstantinovich Filippov, Moscow (RU); Vasily Alexeevich Rufitskiy, Moscow (RU)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/149,443

(22) Filed: Jan. 14, 2021

(65) Prior Publication Data
US 2021/0211719 A1 Jul. 8, 2021

Related U.S. Application Data

(63) Continuation of application No. 16/448,998, filed on Jun. 21, 2019, now Pat. No. 10,911,776, which is a
(Continued)

(51) Int. Cl.
H04N 19/593 (2014.01)
H04N 19/176 (2014.01)
(Continued)

(52) U.S. Cl.
CPC ........... H04N 19/593 (2014.11); H04N 19/11 (2014.11); H04N 19/136 (2014.11);
(Continued)

(58) Field of Classification Search
None
See application file for complete search history.

(56) References Cited

U.S. PATENT DOCUMENTS 9,942,572 B2 * 4/2018 Puri ................. H04N 19/85
9,961,343 B2 * 5/2018 Park .................. H04N 19/176
(Continued)

FOREIGN PATENT DOCUMENTS

CN 104081770 A 10/2014
CN 104935925 A 9/2015
(Continued)

OTHER PUBLICATIONS

Seregin et al., "Variable number of intra modes," Joint Video exploration Team (JVET) of ITU-T SG 16 WP3 and ISO/IEC JTC 1/SC 29/WG 11, JVET-D0113r2, total 2 pages (Oct. 15-21, 2016).
(Continued)

Primary Examiner — Reza Aghevli
(74) Attorney, Agent, or Firm — Leydig, Voit & Mayer, Ltd.

(57) ABSTRACT

An encoding apparatus is described for signaling an extension directional intra-prediction mode within a set of directional intra-prediction modes, the set of directional intra-prediction modes comprising predetermined directional intra-prediction modes and the extension directional intra-prediction mode. The encoding apparatus comprises a mode mapping unit selecting a predetermined directional intra-prediction mode, the selected predetermined directional intra-prediction mode being associated with an intra mode index, and mapping the extension directional intra-prediction mode onto the selected predetermined directional intra-prediction mode. A signaling unit generates a signaling indicator comprising at least one of the intra mode index and a flag value. An intra-prediction unit intra-predicts pixel values of pixels of a rectangular video coding block on the basis of the extension directional intra-prediction mode for providing a predicted rectangular video coding block. An
(Continued)

encoding unit encodes the rectangular video coding block on the basis of the predicted rectangular video coding block.

14 Claims, 19 Drawing Sheets

Related U.S. Application Data continuation of application No. PCT/RU2016/000918, filed on Dec. 23, 2016.

(51) Int. Cl.
*H04N 19/70* (2014.01)
*H04N 19/46* (2014.01)
*H04N 19/136* (2014.01)
*H04N 19/11* (2014.01)

(52) U.S. Cl.
CPC ........... *H04N 19/176* (2014.11); *H04N 19/46* (2014.11); *H04N 19/70* (2014.11)

(56) References Cited

U.S. PATENT DOCUMENTS

| | | | | |
|---|---|---|---|---|
| 2012/0314766 | A1* | 12/2012 | Chien | H04N 19/186 375/E7.243 |
| 2013/0101036 | A1 | 4/2013 | Zhou | |
| 2013/0114716 | A1* | 5/2013 | Gao | H04N 19/182 375/240.14 |
| 2013/0136175 | A1* | 5/2013 | Wang | H04N 19/593 375/240.12 |
| 2014/0079121 | A1* | 3/2014 | Song | H04N 19/593 375/240.12 |
| 2014/0140404 | A1* | 5/2014 | Liu | H04N 19/33 375/240.12 |
| 2014/0219345 | A1* | 8/2014 | Park | H04N 19/593 375/240.12 |
| 2014/0376626 | A1* | 12/2014 | Lee | H04N 19/196 375/240.12 |
| 2015/0016516 | A1* | 1/2015 | Saxena | H04N 19/593 375/240.12 |
| 2015/0078438 | A1* | 3/2015 | Lim | H04N 19/18 375/240.02 |
| 2015/0078447 | A1* | 3/2015 | Gamei | H04N 19/119 375/240.12 |
| 2015/0222891 | A1* | 8/2015 | Park | H04N 19/70 375/240.02 |
| 2016/0173879 | A1* | 6/2016 | Park | H04N 19/45 375/240.03 |
| 2016/0309163 | A1* | 10/2016 | Oh | H04N 19/80 |
| 2017/0180742 | A1 | 6/2017 | Maani et al. | |
| 2018/0063532 | A1* | 3/2018 | Oh | H04N 19/176 |
| 2018/0367793 | A1* | 12/2018 | Park | H04N 19/11 |
| 2019/0052909 | A1* | 2/2019 | Choi | H04N 19/18 |
| 2019/0182481 | A1* | 6/2019 | Lee | H04N 19/159 |
| 2019/0238835 | A1* | 8/2019 | Lee | H04N 19/182 |
| 2019/0238837 | A1* | 8/2019 | Filippov | H04N 19/159 |
| 2019/0238838 | A1* | 8/2019 | Filippov | H04N 19/593 |
| 2019/0313093 | A1* | 10/2019 | Filippov | H04N 19/105 |
| 2019/0313117 | A1* | 10/2019 | Filippov | H04N 19/105 |

FOREIGN PATENT DOCUMENTS

| | | | |
|---|---|---|---|
| EP | 2587805 | A2 | 5/2013 |
| EP | 2745519 | A1 | 6/2014 |
| EP | 2981087 | A1 | 2/2016 |
| EP | 3499884 | A1 | 6/2019 |
| WO | 2008088140 | A1 | 7/2008 |
| WO | 2012161445 | A2 | 11/2012 |
| WO | 2012167119 | A1 | 12/2012 |
| WO | 2012170812 | A1 | 12/2012 |
| WO | 2013082291 | A2 | 6/2013 |

OTHER PUBLICATIONS

Chen et al., "Algorithm description of Joint Exploration Test Model 2," Joint Video exploration Team (JVET) of ITU-T SG 16 WP3 and ISO/IEC JTC 1/SC 29/WG 11, 2nd Meeting: San Diego, USA, JVET-B1001-v3, total 32 pages (Feb. 20-26, 2016).

"Information technology—High efficiency coding and media delivery in heterogeneous environments—Part 2: High efficiency video coding," ISO/IEC 23008-2:2013, pp. 1-13, International Standard (Dec. 2013).

Sullivan et al. "Overview of the High Efficiency Video Coding (HEVC) Standard," in IEEE Transactions on Circuits and Systems for Video Technology, vol. 22, No. 12, pp. 1649-1668, Institute of Electrical and Electronics Engineers-New York, New York (Dec. 2012).

Huang et al., "EE2.1: Quadtree plus binary tree structure integration with JEM tools," Joint Video Exploration Team (JVET) of ITU-T SG 16 WP 3 and ISO/IEC JTC 1/SC 29/WG 11, JVET-C0024, 3rd Meeting: Geneva, CH, pp. 1-5, International Union of Telecommunication—Geneva, Switzerland (May 26-Jun. 1, 2016).

"Series H: Audiovisual and Multimedia Systems Infrastructure of audiovisual services—Coding of moving video, Advanced video coding for generic audiovisual services," ITU-T H.264, pp. 1-804, International Union of Telecommunication—Geneva, Switzerland (Oct. 2016).

"Series H: Audiovisual and Multimedia Systems Infrastructure of audiovisual services—Coding of moving video, High efficiency video coding" ITU-T H.265, pp. 1-634, International Union of Telecommunication—Geneva, Switzerland (Apr. 2015).

Sullivan et al. "Future video coding: Joint Exploration Model 1 (JEM1) for future video coding investigation," ITU-T SG16 Q6, TD 213 (WP 3/16), Geneva, pp. 1-20, International Union of Telecommunication—Geneva, Switzerland (Oct. 12-23, 2015).

Grange et al., "Overview of-VP-Next, A Next Generation Open Video Codec," pp. 1-12, retrieved from the internet: https://www.ietf.org/proceedings/85/slides/slides-85-videocodec-4.pdf on Aug. 14, 2019.

EP/Document No. 16838097.0, Office Action, dated Feb. 23, 2022.

U.S. Appl. No. 16/448,998, filed Jun. 21, 2019.

\* cited by examiner

ENCODING APPARATUS FOR SIGNALING AN EXTENSION DIRECTIONAL INTRA-PREDICTION MODE WITHIN A SET OF DIRECTIONAL INTRA-PREDICTION MODES

CROSS-REFERENCE TO RELATED APPLICATIONS

This application is a continuation of U.S. patent application Ser. No. 16/448,998, filed on Jun. 21, 2019, issued as U.S. Pat. No. 10,911,776, which is a continuation of International Application No. PCT/RU2016/000918, filed on Dec. 23, 2016. All of the aforementioned patent applications are hereby incorporated by reference in their entireties.

TECHNICAL FIELD

Generally, embodiments of the present disclosure relate to the field of video coding. More specifically, embodiments of the present disclosure relate to an encoding apparatus for signaling an extension directional intra-prediction mode for directional intra-prediction of a video coding block using a signaling indicator and a decoding apparatus for handling the signaling indicator.

BACKGROUND

Digital video communication and storage applications are implemented by a wide range of digital devices, e.g. digital cameras, cellular radio telephones, laptops, broadcasting systems, video teleconferencing systems, etc. One of the most important and challenging tasks of these applications is video compression. The task of video compression is complex and is constrained by two contradicting parameters: compression efficiency and computational complexity. Video coding standards, such as ITU-T H.264/AVC or ITU-T H.265/HEVC, provide a good tradeoff between these parameters. For that reason, support of video coding standards is a mandatory requirement for almost any video compression application.

The state-of-the-art video coding standards are based on partitioning of a source picture into video coding blocks (or short blocks). Processing of these blocks depend on their size, spatial position and a coding mode specified by an encoder. Coding modes can be classified into two groups according to the type of prediction: intra- and inter-prediction modes. Intra-prediction modes use pixels of the same picture (also referred to as frame or image) to generate reference samples to calculate the prediction values for the pixels of the block being reconstructed. Intra-prediction is also referred to as spatial prediction. Inter-prediction modes are designed for temporal prediction and uses reference samples of previous or next pictures to predict pixels of the block of the current picture. After a prediction stage, transform coding is performed for a prediction error that is the difference between an original signal and its prediction. Then, the transform coefficients and side information are encoded using an entropy coder (e.g., CABAC for AVC/H.264 and HEVC/H.265). The recently adopted ITU-T H.265/HEVC standard (ISO/IEC 23008-2:2013, "Information technology—High efficiency coding and media delivery in heterogeneous environments—Part 2: High efficiency video coding", Dec. 2013) declares a set of state-of-the-art video coding tools that provide a reasonable tradeoff between coding efficiency and computational complexity. An overview on the ITU-T H.265/HEVC standard has been given by Gary J. Sullivan, "Overview of the High Efficiency Video Coding (HEVC) Standard", in IEEE Transactions on Circuits and Systems for Video Technology, Vol. 22, No. 12, December 2012, the entire content of which is incorporated herein by reference.

Similarly, to the ITU-T H.264/AVC video coding standard, the HEVC/H.265 video coding standard provides for a division of the source picture into blocks, e.g., coding units (CUs). Each of the CUs can be further split into either smaller CUs or prediction units (PUs). A PU can be intra- or inter-predicted according to the type of processing applied for the pixels of PU. In case of inter-prediction, a PU represents an area of pixels that is processed by motion compensation using a motion vector specified for a PU. For intra prediction, the adjacent pixels of neighbor blocks are used as reference samples to predict a current block. A PU specifies a prediction mode that is selected from the set of intra-prediction modes for all the transform units (TUs) contained in this PU. A TU can have different sizes (e.g., 4×4, 8×8, 16×16 and 32×32 pixels) and can be processed in different ways. For a TU, transform coding is performed, i.e. the prediction error is transformed with a discrete cosine transform or a discrete sine transform (in the HEVC/H.265 standard, it is applied to intra-coded blocks) and quantized. Hence, reconstructed pixels contain quantization noise (it can become apparent, for examples, as blockiness between units, ringing artifacts along with sharp edges, etc.) that in-loop filters such as Deblocking Filter (DBF), Sample Adaptive Offset (SAO) and Adaptive Loop Filter (ALF) try to suppress. The use of sophisticated prediction coding (such as motion compensation and intra-prediction) and partitioning techniques (e.g., quadtree for CUs and PUs as well as residual quadtree for TUs in the HEVC/H.265 standard and quadtree plus binary tree for the JEM reference software starting from version JEM-3.0) allowed the standardization committee to significantly reduce the redundancy in PUs.

According to the HEVC/H.265 standard, the intra prediction modes as shown in FIG. 5 include a planar mode (the intra-prediction mode index is 0), DC mode (the intra-prediction mode index is 1), and 33 directional modes (the intra-prediction mode index ranges from 2 to 34, indicated by the solid lines). The set of directional intra-prediction modes was extended up to 65 modes (almost doubled) by decreasing a step angle between directional intra-prediction modes by a factor of 2. The dotted lines in FIG. 5 denote the angular modes, which are introduced in the JEM software.

For the JEM-3.0 software, a new partitioning mechanism based on both quad-tree and binary-tree (known as QTBT) was proposed. The fundamental difference between the QT and QTBT partitioning mechanisms is that the latter one enables not only square but also rectangular blocks by using partitioning based on both quad- and binary-tree. FIG. 6 illustrates an example of block partitioning and a corresponding tree structure by using QTBT, wherein solid lines denote quad-tree partitioning and dashed lines denote binary-tree partitioning. In each partitioning node of the binary-tree, the partitioning type is indicated by 0 (horizontal partitioning) or 1 (vertical partitioning).

Some signaling overhead and increased computational complexity at the encoder side are the price of the QTBT partitioning as compared to conventional quad-tree based partitioning used in the HEVC/H.265 standard. Nevertheless, the QTBT-based partitioning is endowed with better segmentation properties and demonstrates significantly higher coding efficiency than the conventional quad-tree ("EE2.1: Quadtree plus binary tree structure integration with JEM tools," Contribution JVET-C0024 to the $3^{rd}$ JVET meeting, Geneva, Switzerland, May 2016 by Han Huang, Kai Zhang, Yu-Wen Huang, Shawmin Lei). However, the QTBT partitioning has a critical problem: a set of available directional intra-prediction modes has not been changed accordingly. Thus, the asymmetry nature of rectangular blocks utilized by the QTBT framework has not been taken into account, as shown in FIG. 7, i.e., the same number of reference samples are used along both shorter and longer sides of rectangular blocks. Therefore, the number of directional intra-prediction modes depends on neither aspect ratio of blocks nor actual availability of reference samples in the current implementation of the QTBT framework.

In light of the above, there is a need for apparatuses and methods for video coding, which allow for an efficient handling of rectangular video coding blocks.

SUMMARY

It is an object to provide apparatuses and methods for video coding, which allow for an efficient handling of rectangular video coding blocks in conjunction with a directional intra-prediction mechanism.

The foregoing and other objects are achieved by the subject matter of the independent claims. Further implementation forms are apparent from the dependent claims, the description and the figures.

The following disclosure employs a plurality of terms which, in embodiments, have the following meaning: Slice—a spatially distinct region of a picture that is independently encoded/decoded. Slice header—Data structure configured to signal information associated with a particular slice. Video coding block (or short block)—an M×N (M-column by N-row) array of pixels or samples (each pixel/sample being associated with at least one pixel/sample value), or an M×N array of transform coefficients. Coding Tree Unit (CTU) grid—a grid structure employed to partition blocks of pixels into macro-blocks for video encoding. Coding Unit (CU)—a coding block of luma samples, two corresponding coding blocks of chroma samples of an image that has three sample arrays, or a coding block of samples of a monochrome picture or a picture that is coded using three separate color planes and syntax used to code the samples. Picture Parameter Set (PPS)—a syntax structure containing syntax elements that apply to zero or more entire coded pictures as determined by a syntax element found in each slice segment header. Sequence Parameter Set (SPS)—a syntax structure containing syntax elements that apply to zero or more entire coded video sequences as determined by the content of a syntax element found in the PPS referred to by a syntax element found in each slice segment header. Video Parameter Set (VPS)—a syntax structure containing syntax elements that apply to zero or more entire coded video sequences. Prediction Unit (PU)—a prediction block of luma samples, two corresponding prediction blocks of chroma samples of a picture that has three sample arrays, or a prediction block of samples of a monochrome picture or a picture that is coded using three separate color planes and syntax used to predict the prediction block samples. Transform Unit (TU)—a transform block of luma samples, two corresponding transform blocks of chroma samples of a picture that has three sample arrays, or a transform block of samples of a monochrome picture or a picture that is coded using three separate color planes and syntax used to predict the transform block samples. Supplemental enhancement information (SEI)—extra information that may be inserted into a video bit-stream to enhance the use of the video. Luma—information indicating the brightness of an image sample. Chroma—information indicating the color of an image sample, which may be described in terms of red difference chroma component (Cr) and blue difference chroma component (Cb).

Generally, the present disclosure relates to an apparatus and a method for improving the directional intra-prediction mechanism within the QTBT framework. More specifically, the present disclosure extends a set of available directional intra-prediction modes subject to the aspect ratio of a block to be predicted, enables or disables some directional intra-prediction modes subject to the availability of reference samples, signals directional intra-prediction modes contained in the extended subset via mode mapping and a one-bit flag.

Embodiments of the present invention provide, amongst others, the following advantages: additional coding gain after integrating this technique into a codec, extensive applications in hybrid video coding paradigms compatible with the HM software and the VPX video codec family as well as in the state-of-the-art and next-generation video coding frameworks (the JEM software and VPX/AV1 video codec family respectively), low hardware and computational complexities at both encoder and decoder sides, easy implementation in such codecs that use conventional directional intra-prediction mechanisms.

According to a first aspect, the invention relates to an encoding apparatus for encoding a rectangular video coding block, the encoding apparatus being configured to signal an extension directional intra-prediction mode within a set of directional intra-prediction modes using a signaling indicator, the set of directional intra-prediction modes comprising predetermined directional intra-prediction modes and the extension directional intra-prediction mode. The encoding apparatus comprises a mode mapping unit configured to select a predetermined directional intra-prediction mode from the set of directional intra-prediction modes in dependence of the extension directional intra-prediction mode, the selected predetermined directional intra-prediction mode being associated with an intra mode index, and to map the extension directional intra-prediction mode onto the selected predetermined directional intra-prediction mode, a signaling unit configured to generate the signaling indicator comprising at least one of the intra mode index and a flag value, the flag value indicating the mapping of the extension directional intra-prediction mode onto the selected predetermined directional intra-prediction mode, wherein the flag value is used when the intra mode index is associated with or mapped to the extension directional intra-prediction mode, and to associate the signaling indicator with the extension directional intra-prediction mode, an intra-prediction unit configured to intra-predict pixel values of pixels of the rectangular video coding block on the basis of the extension directional intra-prediction mode associated with the signaling indicator for providing a predicted rectangular video coding block, and an encoding unit configured to encode the rectangular video coding block on the basis of the predicted rectangular video coding block.

The selection of the predetermined directional intra-prediction mode from the set of directional intra-prediction modes by the mode mapping unit can e.g. be performed such that a complementary direction of the extension directional intra-prediction mode is opposite to a predetermined direction of the selected predetermined directional intra-prediction mode. For this purpose, a mirroring procedure can be applied.

In a first implementation form of the encoding apparatus according to the first aspect as such, each predetermined directional intra-prediction mode is associated with a predetermined direction within a predetermined directional range, wherein the extension directional intra-prediction mode is associated with a complementary direction within a complementary directional range, and wherein the directional range is different from the predetermined directional range.

In this regard, the term "direction" refers to an orientation within the video coding block to be used for directional intra-prediction within the video coding block. The term "directional range" refers to range covering a plurality of said directions.

In a second implementation form of the encoding apparatus according to the first implementation form of the first aspect, the complementary direction of the extension directional intra-prediction mode is opposite to the predetermined direction of the selected predetermined directional intra-prediction mode.

In a third implementation form of the encoding apparatus according to the first implementation form or the second implementation form of the first aspect, the complementary directional range and the predetermined directional range are adjacent.

In a fourth implementation form of the encoding apparatus according to the first aspect as such or any preceding implementation form of the first aspect, the flag value is a binary value.

In a fifth implementation form of the encoding apparatus according to the first aspect as such or any preceding implementation form of the first aspect, the signaling indicator comprises a most-probable-mode (MPM) indicator.

In a sixth implementation form of the encoding apparatus according to the first aspect as such or any preceding implementation form of the first aspect, the rectangular video coding block is a coding unit (CU), a prediction unit (PU), or a transform unit (TU).

According to a second aspect, the invention relates to a decoding apparatus for decoding an encoded rectangular video coding block, the decoding apparatus being configured to handle a signaling indicator associated with an extension directional intra-prediction mode, the signaling indicator comprising an intra mode index, the intra mode index being associated with a predetermined directional intra-prediction mode. The decoding apparatus comprises an intra-prediction unit configured to intra-predict pixel values of pixels of the encoded rectangular video coding block on the basis of the extension directional intra-prediction mode associated with the signaling indicator for providing a predicted rectangular video coding block, and a restoration unit configured to restore a rectangular video coding block on the basis of the encoded rectangular video coding block and the predicted rectangular video coding block.

In a first implementation form of the decoding apparatus according to the second aspect as such, the signaling indicator further comprises a flag value, the flag value indicating a mapping of the extension directional intra-prediction mode onto the predetermined directional intra-prediction mode, wherein the flag value is used when the intra mode index is associated with or mapped to the extension directional intra-prediction mode.

According to a third aspect, the invention relates to an encoding method for encoding a rectangular video coding block, the encoding method being configured to signal an extension directional intra-prediction mode within a set of directional intra-prediction modes using a signaling indicator, the set of directional intra-prediction modes comprising predetermined directional intra-prediction modes and the extension directional intra-prediction mode. The encoding method comprises selecting a predetermined directional intra-prediction mode from the set of directional intra-prediction modes in dependence of the extension directional intra-prediction mode, the selected predetermined directional intra-prediction mode being associated with an intra mode index, mapping the extension directional intra-prediction mode onto the selected predetermined directional intra-prediction mode, generating the signaling indicator comprising at least one of the intra mode index and a flag value, the flag value indicating the mapping of the extension directional intra-prediction mode onto the selected predetermined directional intra-prediction mode, wherein the flag value is used when the intra mode index is associated with or mapped to the extension directional intra-prediction mode, associating the signaling indicator with the extension directional intra-prediction mode, intra-predicting pixel values of pixels of the rectangular video coding block on the basis of the extension directional intra-prediction mode associated with the signaling indicator for providing a predicted rectangular video coding block, and encoding the rectangular video coding block on the basis of the predicted rectangular video coding block.

The encoding method can be performed by the encoding apparatus. Further features of the encoding method directly result from the features or the functionality of the encoding apparatus.

According to a fourth aspect, the invention relates to a decoding method for decoding an encoded rectangular video coding block, the decoding method being configured to handle a signaling indicator associated with an extension directional intra-prediction mode, the signaling indicator comprising an intra mode index, the intra mode index being associated with a predetermined directional intra-prediction mode. The decoding method comprises intra-predicting pixel values of pixels of the encoded rectangular video coding block on the basis of the extension directional intra-prediction mode associated with the signaling indicator for providing a predicted rectangular video coding block, and restoring a rectangular video coding block on the basis of the encoded rectangular video coding block and the predicted rectangular video coding block.

The decoding method can be performed by the decoding apparatus. Further features of the decoding method directly result from the features or the functionality of the decoding apparatus.

In a first implementation form of the decoding method according to the fourth aspect as such, the signaling indicator further comprises a flag value, the flag value indicating a mapping of the extension directional intra-prediction mode onto the predetermined directional intra-prediction mode, wherein the flag value is used when the intra mode index is associated with or mapped to the extension directional intra-prediction mode.

According to a fifth aspect, the invention relates to a computer program comprising program code for performing the method according to the third aspect as such or any implementation form of the third aspect or the fourth aspect as such or any implementation form of the fourth aspect when executed on a computer.

Embodiments of the invention can be implemented in hardware and/or software.

BRIEF DESCRIPTION OF THE DRAWINGS

Further embodiments of the invention will be described with respect to the following figures, wherein.

In the various figures, identical reference signs will be used for identical or at least functionally equivalent features.

DETAILED DESCRIPTION OF EMBODIMENTS

In the following description, reference is made to the accompanying drawings, which form part of the disclosure, and in which are shown, by way of illustration, specific aspects in which embodiments of the present invention may be placed. It is understood that other aspects may be utilized and structural or logical changes may be made without departing from the scope of the present invention. The following detailed description, therefore, is not to be taken in a limiting sense, as the scope of the present invention is defined be the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
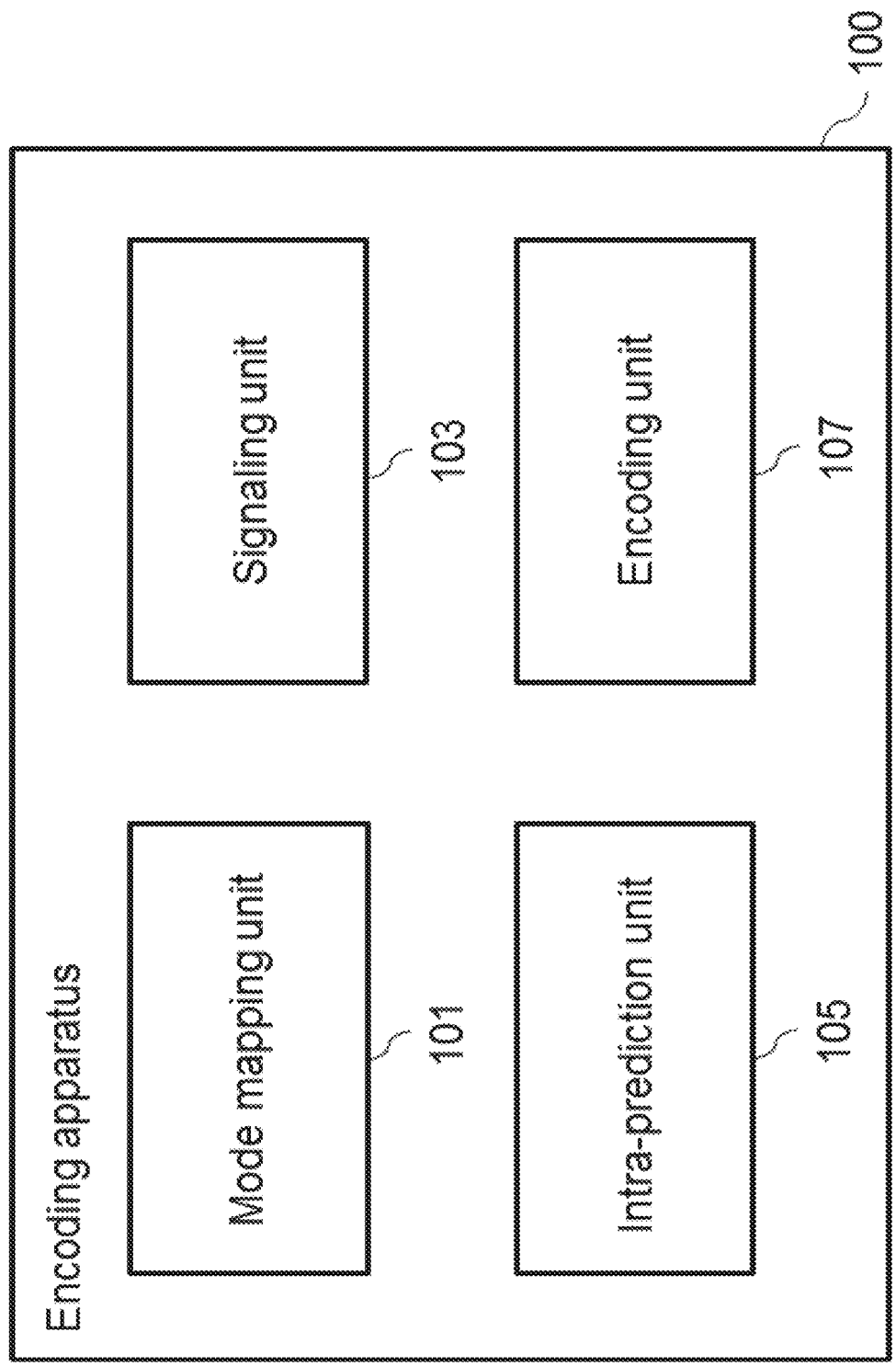
FIG. 1 shows a schematic diagram of an encoding apparatus for encoding a rectangular video coding block.

FIG. 1 shows a schematic diagram of an encoding apparatus 100 for encoding a rectangular video coding block. The encoding apparatus 100 is configured to signal an extension directional intra-prediction mode within a set of directional intra-prediction modes using a signaling indicator, the set of directional intra-prediction modes comprising predetermined directional intra-prediction modes and the extension directional intra-prediction mode. The encoding apparatus 100 comprises a mode mapping unit 101 configured to select a predetermined directional intra-prediction mode from the set of directional intra-prediction modes in dependence of the extension directional intra-prediction mode, the selected predetermined directional intra-prediction mode being associated with an intra mode index, and to map the extension directional intra-prediction mode onto the selected predetermined directional intra-prediction mode, a signaling unit 103 configured to generate the signaling indicator comprising at least one of the intra mode index and a flag value, the flag value indicating the mapping of the extension directional intra-prediction mode onto the selected predetermined directional intra-prediction mode, wherein the flag value is used when the intra mode index is associated with or mapped to the extension directional intra-prediction mode, and to associate the signaling indicator with the extension directional intra-prediction mode, an intra-prediction unit 105 configured to intra-predict pixel values of pixels of the rectangular video coding block on the basis of the extension directional intra-prediction mode associated with the signaling indicator for providing a predicted rectangular video coding block, and an encoding unit 107 configured to encode the rectangular video coding block on the basis of the predicted rectangular video coding block.

Figure 2:
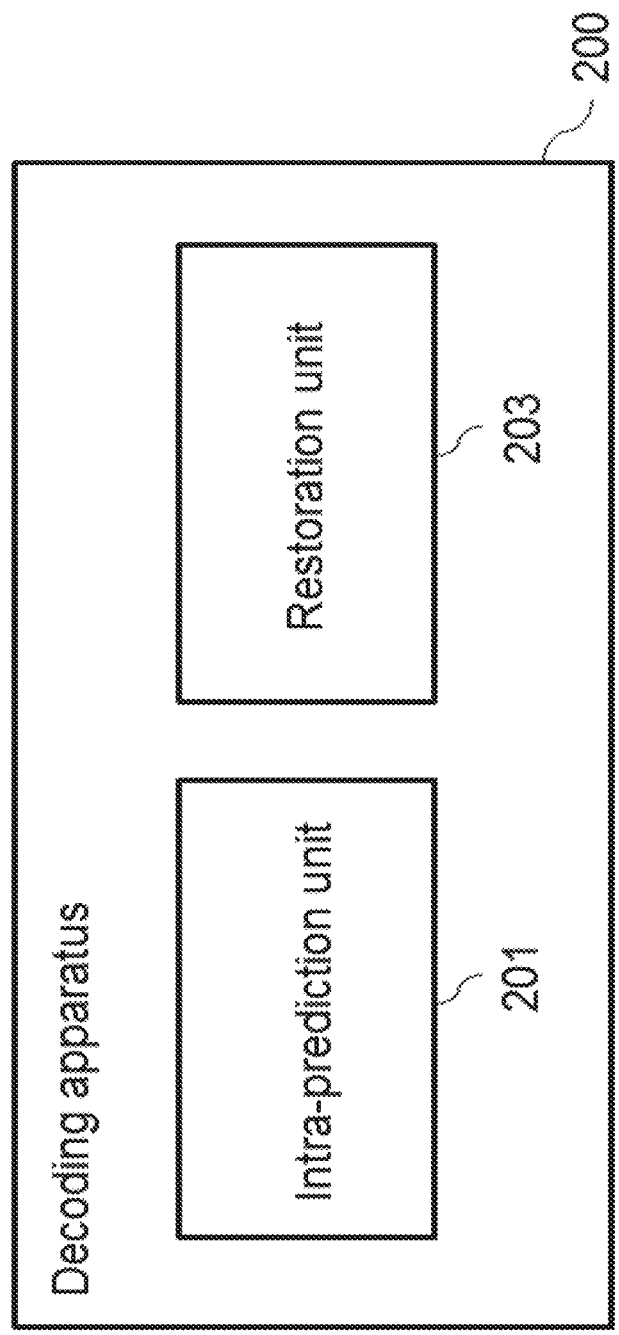
FIG. 2 shows a schematic diagram of a decoding apparatus for decoding an encoded rectangular video coding block.

FIG. 2 shows a schematic diagram of a decoding apparatus 200 for decoding an encoded rectangular video coding block. The decoding apparatus 200 is configured to handle a signaling indicator associated with an extension directional intra-prediction mode, the signaling indicator comprising an intra mode index, the intra mode index being associated with a predetermined directional intra-prediction mode. The decoding apparatus 200 comprises an intra-prediction unit 201 configured to intra-predict pixel values of pixels of the encoded rectangular video coding block on the basis of the extension directional intra-prediction mode associated with the signaling indicator for providing a predicted rectangular video coding block, and a restoration unit 203 configured to restore a rectangular video coding block on the basis of the encoded rectangular video coding block and the predicted rectangular video coding block. The signaling indicator can further comprise a flag value, the flag value indicating a mapping of the extension directional intra-prediction mode onto the predetermined directional intra-prediction mode.

Figure 3:
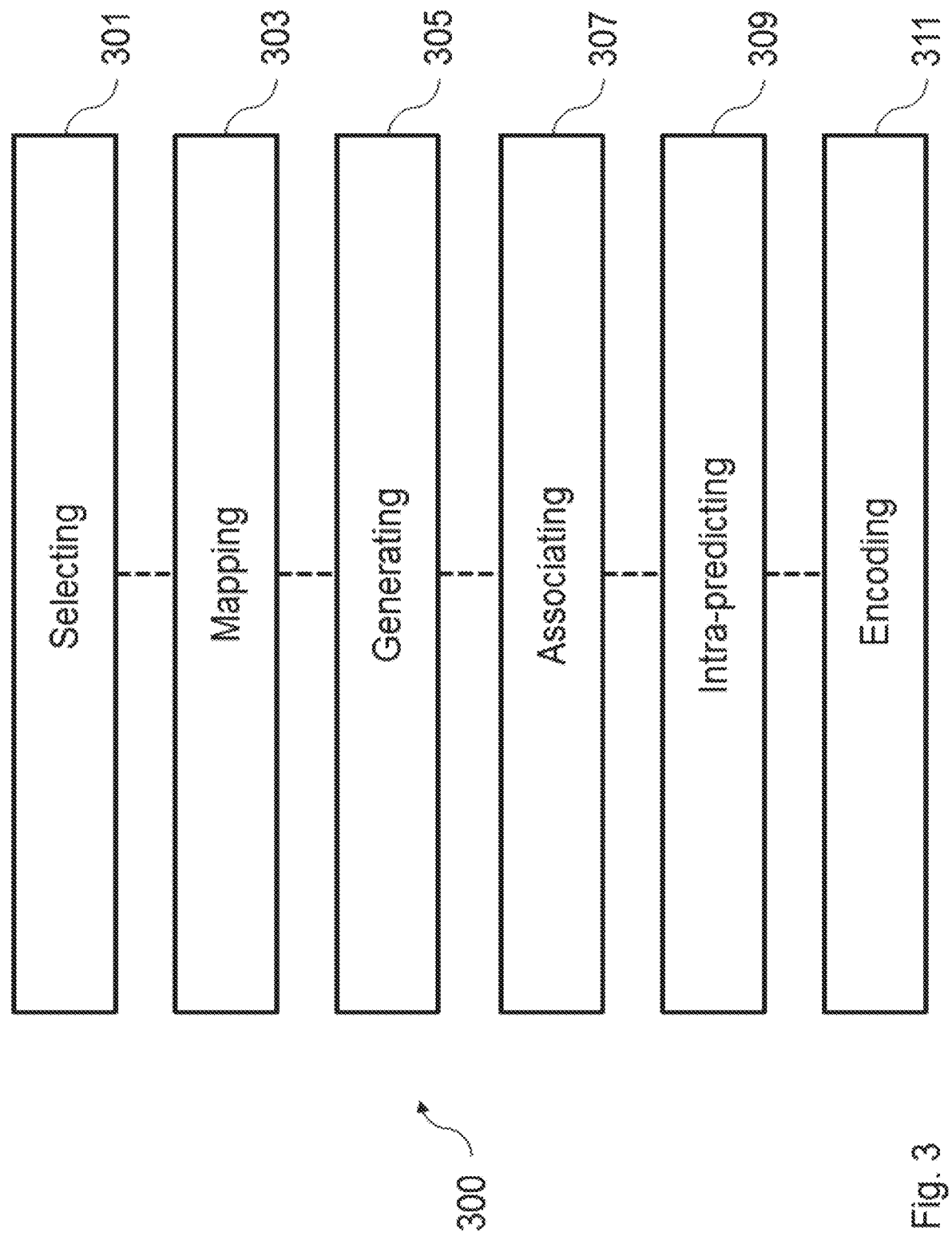
FIG. 3 shows a schematic diagram of an encoding method for encoding a rectangular video coding block.

FIG. 3 shows a schematic diagram of an encoding method 300 for encoding a rectangular video coding block. The encoding method 300 being configured to signal an extension directional intra-prediction mode within a set of directional intra-prediction modes using a signaling indicator, the set of directional intra-prediction modes comprising predetermined directional intra-prediction modes and the extension directional intra-prediction mode. The encoding method 300 comprises selecting 301 a predetermined directional intra-prediction mode from the set of directional intra-prediction modes in dependence of the extension directional intra-prediction mode, the selected predetermined directional intra-prediction mode being associated with an intra mode index, mapping 303 the extension directional intra-prediction mode onto the selected predetermined directional intra-prediction mode, generating 305 the signaling indicator comprising at least one of the intra mode index and a flag value, the flag value indicating the mapping of the extension directional intra-prediction mode onto the selected predetermined directional intra-prediction mode, wherein the flag value is used when the intra mode index is associated with or mapped to the extension directional intra-prediction mode, associating 307 the signaling indicator with the extension directional intra-prediction mode, intra-predicting 309 pixel values of pixels of the rectangular video coding block on the basis of the extension directional intra-prediction mode associated with the signaling indicator for providing a predicted rectangular video coding block, and encoding 311 the rectangular video coding block on the basis of the predicted rectangular video coding block.

Figure 4:
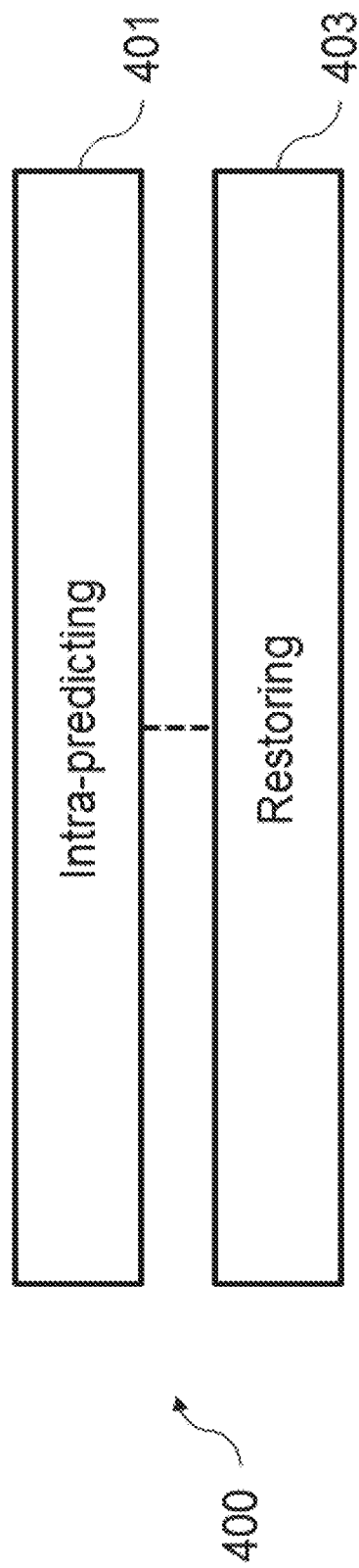
FIG. 4 shows a schematic diagram of a decoding method for decoding an encoded rectangular video coding block.

FIG. 4 shows a schematic diagram of a decoding method 400 for decoding an encoded rectangular video coding block. The decoding method 400 being configured to handle a signaling indicator associated with an extension directional intra-prediction mode, the signaling indicator comprising an intra mode index, the intra mode index being associated with a predetermined directional intra-prediction mode. The decoding method 400 comprises intra-predicting 401 pixel values of pixels of the encoded rectangular video coding block on the basis of the extension directional intra-prediction mode associated with the signaling indicator for providing a predicted rectangular video coding block, and restoring 403 a rectangular video coding block on the basis of the encoded rectangular video coding block and the predicted rectangular video coding block. The signaling indicator can further comprise a flag value, the flag value indicating a mapping of the extension directional intra-prediction mode onto the predetermined directional intra-prediction mode.

Figure 5:
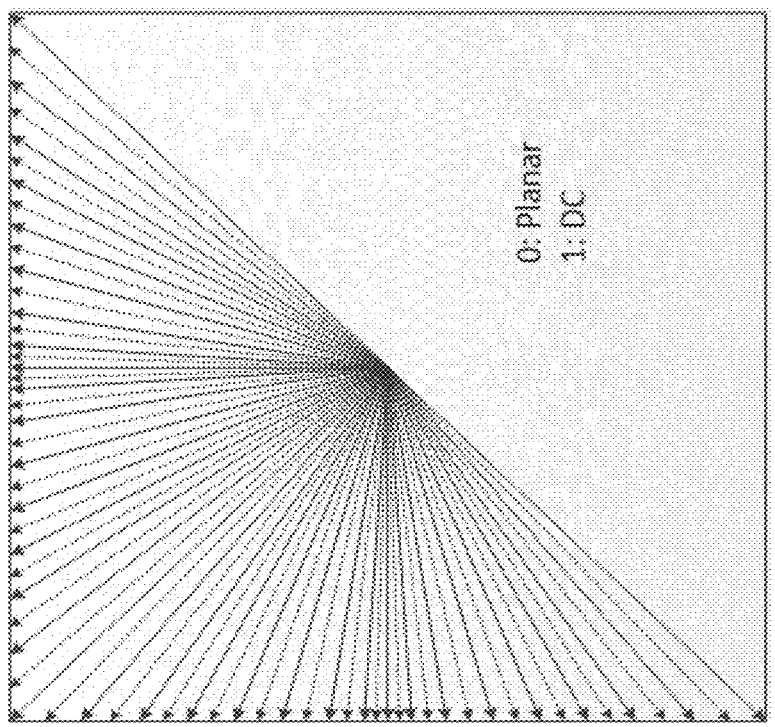
FIG. 5 shows a schematic diagram of a video coding block illustrating different directional intra-prediction modes.

FIG. 5 shows a schematic diagram of a video coding block illustrating different directional intra-prediction modes. The intra prediction modes as shown in FIG. 5 include a planar mode (the intra-prediction mode index is 0), DC mode (the intra-prediction mode index is 1), and 33 directional modes (the intra-prediction mode index ranges from 2 to 34, indicated by the solid lines). The set of directional intra-prediction modes was extended up to 65 modes (almost doubled) by decreasing a step angle between directional intra-prediction modes by a factor of 2. The dotted lines in FIG. 5 denote the angular modes, which are introduced in the JEM software.

Figure 6:
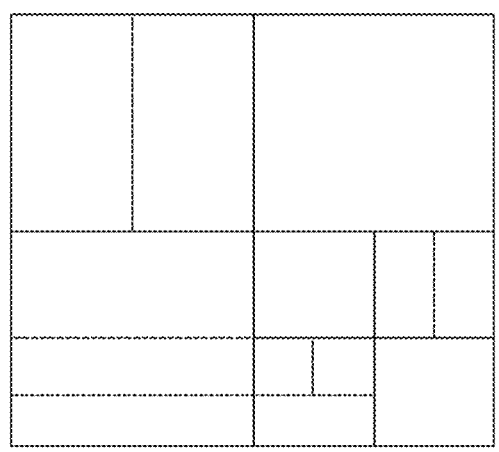
FIGS. 6(a) and 6(b) illustrate an example of block partitioning and a corresponding tree structure by using quad-tree plus binary-tree (QTBT)
Figure 6:
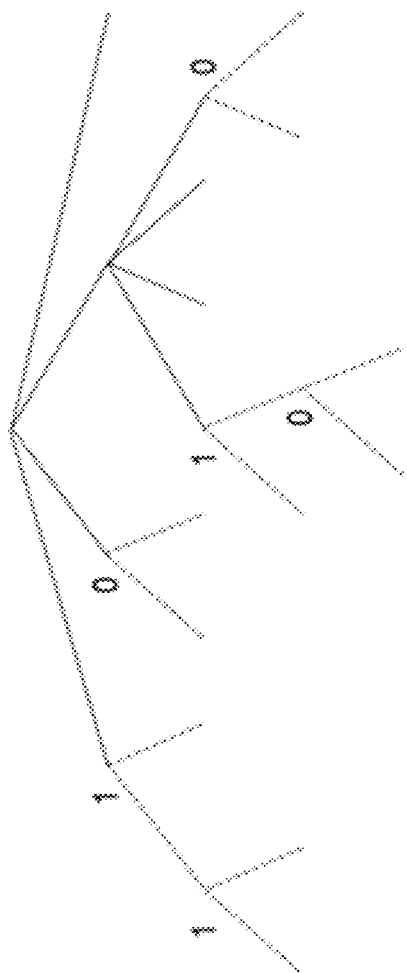

FIGS. 6a and 6b illustrate an example of block partitioning and a corresponding tree structure by using quad-tree plus binary-tree (QTBT), wherein solid lines denote quad-tree partitioning and dashed lines denote binary-tree partitioning. In each partitioning node of the binary-tree, the partitioning type is indicated by 0 (horizontal partitioning) or 1 (vertical partitioning).

Figure 7:
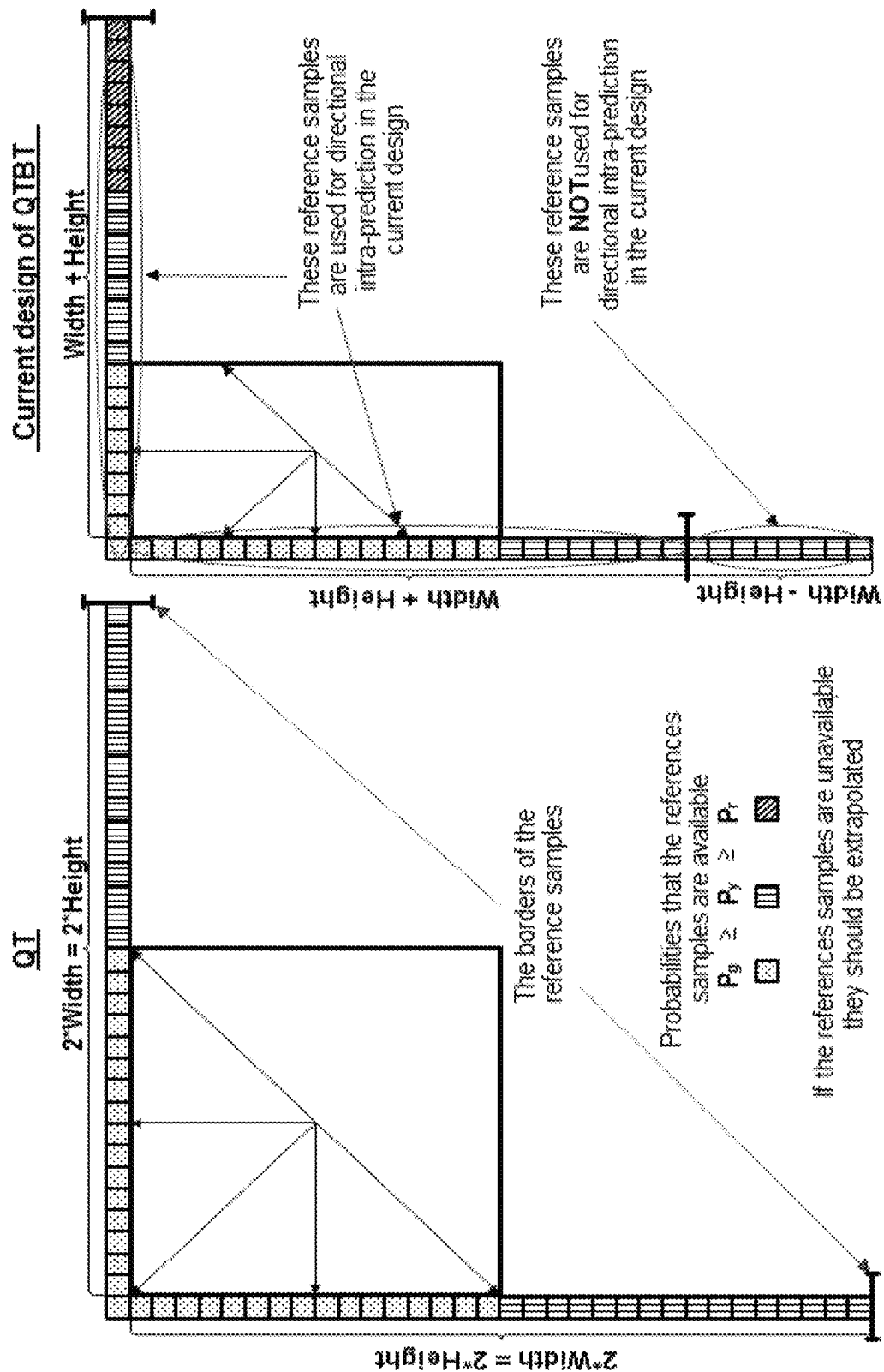
FIGS. 7(a) and 7(b) illustrate implementations of a directional intra-prediction mechanism in quad-tree (QT) and quad-tree plus binary-tree (QTBT) frameworks, respectively.

FIGS. 7a and 7b illustrate implementations of a directional intra-prediction mechanism in quad-tree (QT) and quad-tree plus binary-tree (QTBT) frameworks, respectively. Here, the same number of reference samples are used along both shorter and longer sides of rectangular blocks. Therefore, the number of directional intra-prediction modes depends on neither aspect ratio of blocks nor actual availability of reference samples in the current implementation of the QTBT framework.

Figure 8:
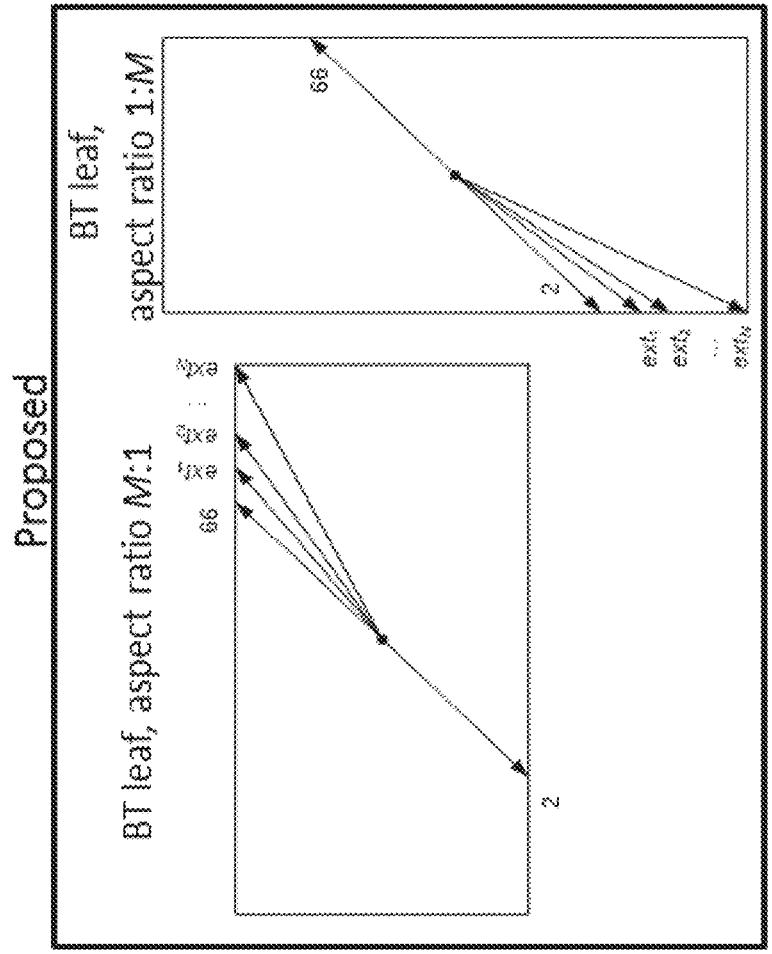
FIGS. 8a and 8b illustrate an extension of a set of directional intra-prediction modes subject to an aspect ratio of a given rectangular video coding block.
Figure 8:
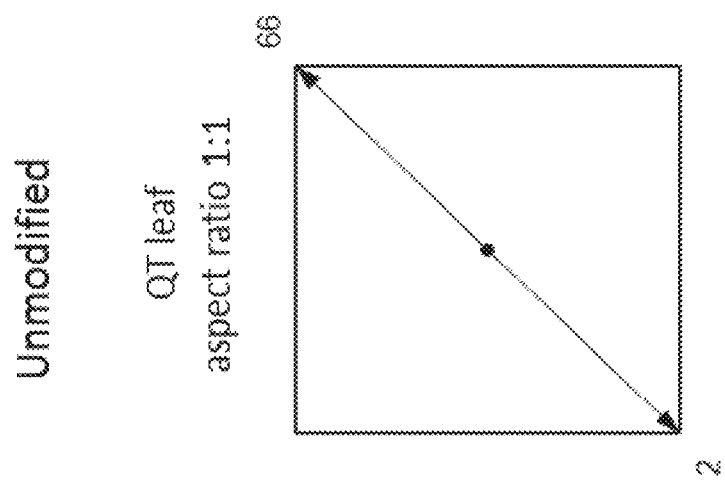

FIGS. 8a and 8b illustrate an extension of a set of directional intra-prediction modes subject to an aspect ratio of a given rectangular video coding block. As shown in FIG. 8a, an aspect ratio of a square video coding block is 1:1 and a set of conventional directional intra-prediction modes is used for predicting values of a video coding block being reconstructed. On the other hand, a rectangular video coding block comprises shorter and longer sides, and such asymmetry can be used to improve the current directional intra-prediction mechanism by increasing its prediction accuracy. As illustrated in FIG. 8b, the number of available directional intra-prediction modes can be increased along a long side.

Figure 9:
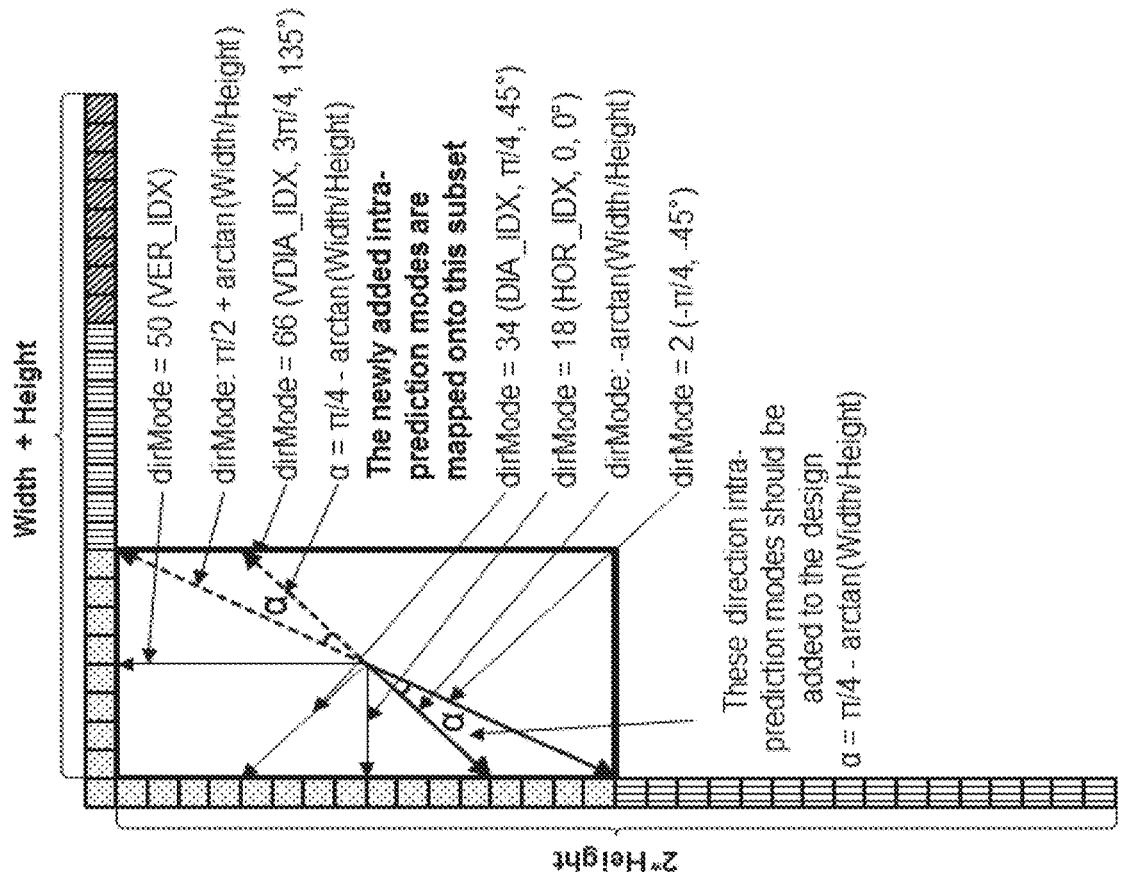
FIG. 9 shows a schematic diagram illustrating an extension of a set of directional intra-prediction modes subject to an aspect ratio of a given rectangular video coding block.

FIG. 9 shows a schematic diagram illustrating an extension of a set of directional intra-prediction modes subject to an aspect ratio of a given rectangular video coding block. The corresponding processing steps may be implemented by the intra-prediction apparatus 100 and/or the intra-prediction method 400. In FIG. 9, square pixels represent reference samples for intra-prediction, wherein the order of probabilities that the reference samples are available is: reference pixel with dots>reference pixel with stripes>reference pixel with diagonal stripes.

The number of the newly introduced directional intra-prediction modes may depend on the aspect ratio of the rectangular video coding block. The angle that encompasses these new modes is defined by the following formula:

$$\alpha = \frac{\pi}{4} - \arctan\left(\frac{L_{shorter}}{L_{longer}}\right)$$

wherein $L_{shorter}$ and $L_{longer}$ are the lengths of the shorter and longer sides of the rectangular video coding block, respectively. As illustrated in FIG. 9, $L_{shorter}$=width and $L_{longer}$=height for a vertical orientation of the rectangular video coding block. The actual number of these modes may depend on the angle between neighbor directional modes and the angle α defined by the above formula.

In the up-to-date version of the JEM software (version JEM-4.0), the average angle step between neighbor directional modes defined by an intra-prediction interpolation filter does not depend on the block size and equals:

$$s = \frac{\pi}{64}$$

Thus, in the case of uniformly spaced directional intra-prediction modes, the number N of the newly introduced modes equals:

$$N = \left\lfloor \frac{\alpha}{s} \right\rfloor = 16 - \left\lfloor \frac{64}{\pi} \arctan\left(\frac{L_{shorter}}{L_{longer}}\right) \right\rfloor$$

wherein $\lfloor \cdot \rfloor$ is a floor operation.

In the embodiment shown in FIG. 9, the number of reference samples is extended along the longer side, and it is not reduced for the shorter side. Therefore, the amount of intra-prediction modes that are available along the longer side (the angle that encompasses these modes is marked by a solid line) is increased, but the number of intra-prediction modes that are available along the shorter side (the angle that encompasses these modes is marked by a dashed line) is not decreased. Hence, the cardinality of the intra-prediction mode set is only increased while the aspect ratio $$R_{asp} = \frac{L_{shorter}}{L_{longer}}$$

is decreasing. On the other hand, another approach to preserve the original number of directional intra-prediction modes is also possible according to another embodiment.

Figure 10:
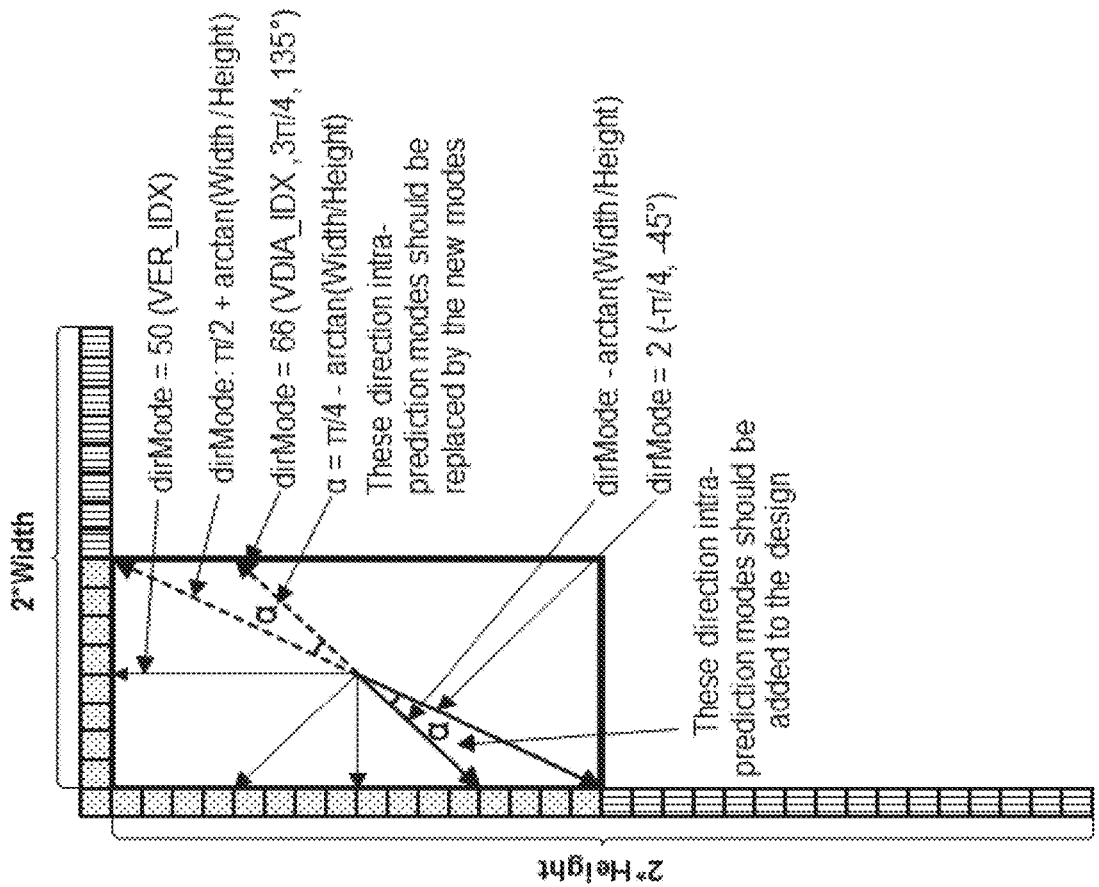
FIG. 10 shows a schematic diagram illustrating a preservation of a cardinality of directional intra-prediction modes subject to an aspect ratio of a given rectangular video coding block.

FIG. 10 shows a schematic diagram illustrating a preservation of a cardinality of directional intra-prediction modes subject to an aspect ratio of a given rectangular video coding block. As shown in FIG. 10, the amount of the directional intra-prediction modes added along the longer side (the angle that encompasses these modes is marked by a solid line) may be equal to the amount of the directional intra-prediction modes removed along the shorter side (the angle that encompasses these modes is marked by a dashed lines). Thus, the cardinality of the intra-prediction mode set remains the same as for square blocks.

According to an embodiment, whether to extend a set of available intra-prediction modes or not can also depend on the availability of reference samples because they are needed to generate an intra-predictor.

Figure 11:
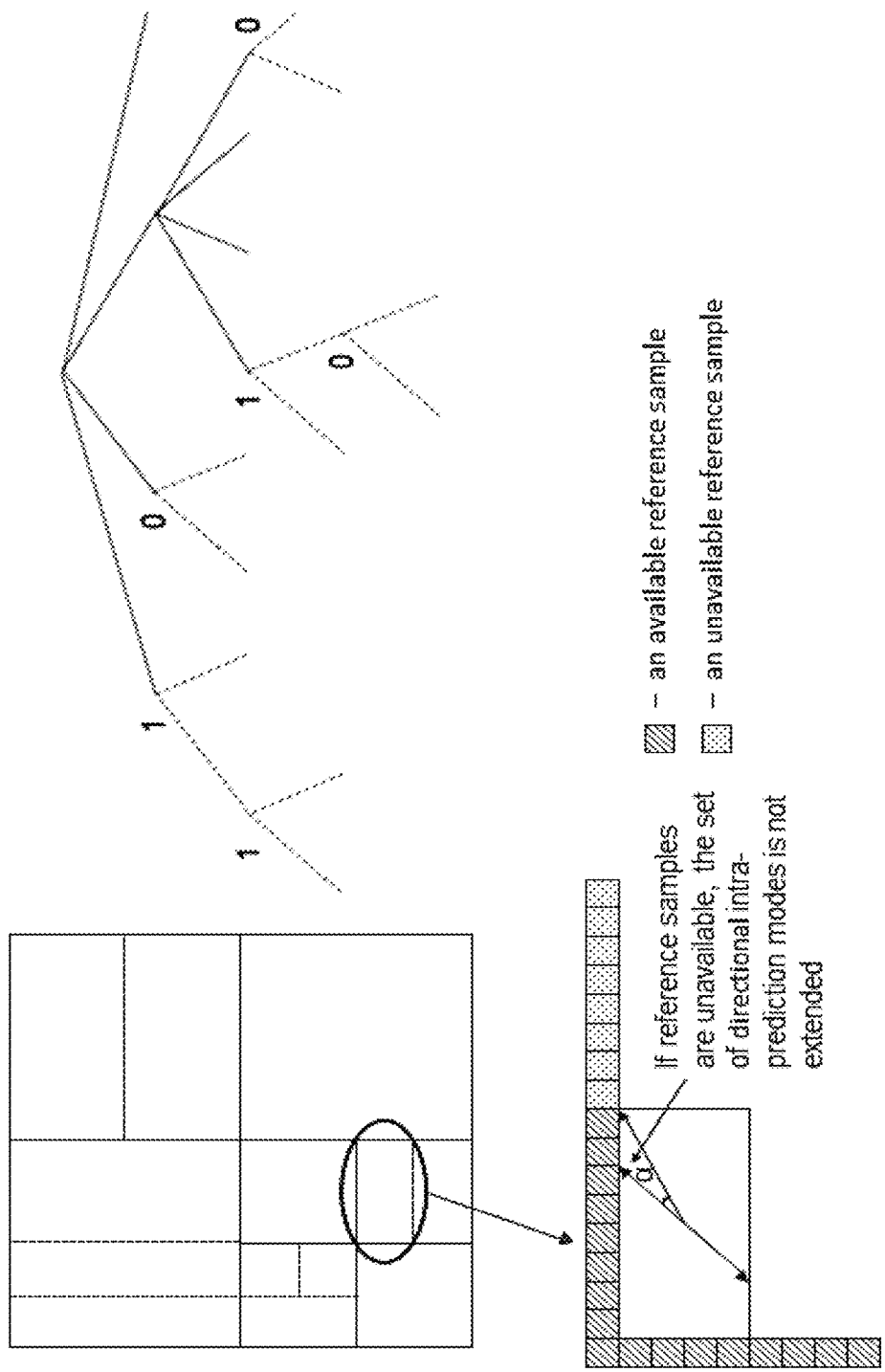
FIG. 11 illustrates an example of block partitioning and a corresponding tree structure by using quad-tree plus binary-tree (QTBT), wherein the number of available reference samples along a longer side is less than its double length in a rectangular video coding block.

FIG. 11 illustrates an example of block partitioning and a corresponding tree structure by using quad-tree plus binary-tree (QTBT), wherein the number of available reference samples along a longer side is less than its double length in a rectangular video coding block. As shown in FIG. 11, the quad-tree plus binary-tree (QTBT) partitioning framework produces a partitioning, wherein the actual number of available reference samples along a longer side is less than its double length as assumed in the above examples in FIGS. 9 and 10. Therefore, the approach for increasing the number of the directional intra-prediction modes in the above examples may need to be adjusted according to an availability of reference samples for the case of FIG. 11.

Figure 12:
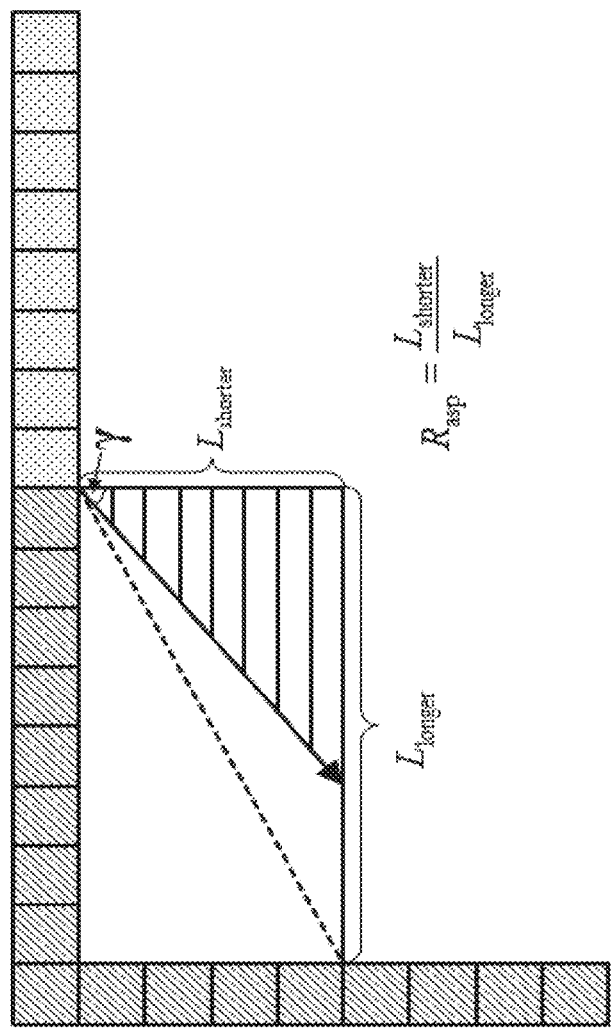
FIG. 12 illustrates enabling or disabling a set of directional intra-prediction modes subject to an availability of reference samples of a given rectangular video coding block.

FIG. 12 illustrates enabling or disabling a set of directional intra-prediction modes subject to an availability of reference samples of a given rectangular video coding block within the quad-tree plus binary-tree (QTBT) partitioning framework, wherein a grey rectangle area represents a currently processed video coding block, square pixels with diagonal stripes indicate available reference samples, and square pixels with dots indicate unavailable reference samples. Disabling can e.g. be achieved by removing a respective directional intra-prediction mode from the set.

A fractional non-prediction area P of a rectangular video coding block generated using interpolated reference samples may be calculated as follows:

$$P_{area} = \frac{S_{uncov}}{S_{block}} = \frac{S_{uncov}}{L_{shorter} \cdot L_{longer}} = \frac{L_{shorter}^2 \cdot \tan \gamma}{2 \cdot L_{shorter} \cdot L_{longer}} =$$

$$= \frac{L_{shorter} \cdot \tan \gamma}{2 \cdot L_{longer}} = \frac{L_{shorter}}{L_{longer}} \cdot \frac{\tan \gamma}{2} = R_{asp} \cdot \frac{\tan \gamma}{2}$$

wherein $L_{longer}$ and $L_{shorter}$ are the lengths of the longer and shorted sides of a rectangular video coding block, respectively, $\gamma$ is the angle of a given directional intra-prediction mode belonging to the extended set, $S_{block} = L_{shorter} \cdot L_{longer}$ is the area of a rectangular video coding block to be predicted, $$S_{uncov} = \frac{L_{shorter}^2 \cdot \tan \gamma}{2}$$

is the non-prediction area, i.e. the area of the video coding block that may not be predicted using non-interpolated reference samples, as marked by stripes.

Therefore, the closer an intra-prediction direction is located to the diagonal marked by a dashed line, the larger part of an area that remains may not be predicted using non-interpolated reference samples. In an example, the set of directional intra-prediction modes is not extended if the length $L_{RSlonger}$ of non-interpolated reference samples along the longer side is less than the double length of the longer side:

$L_{RSlonger} < 2L_{longer}.$

If a set of directional intra-prediction modes is extended, it is desirable to signal the newly extended modes, which may not be accomplished using existing conventional mechanisms. For this purpose, a 2-step signaling mechanism for the extension of directional intra-prediction modes is proposed and explained in FIGS. 13 and 14.

Figure 13:
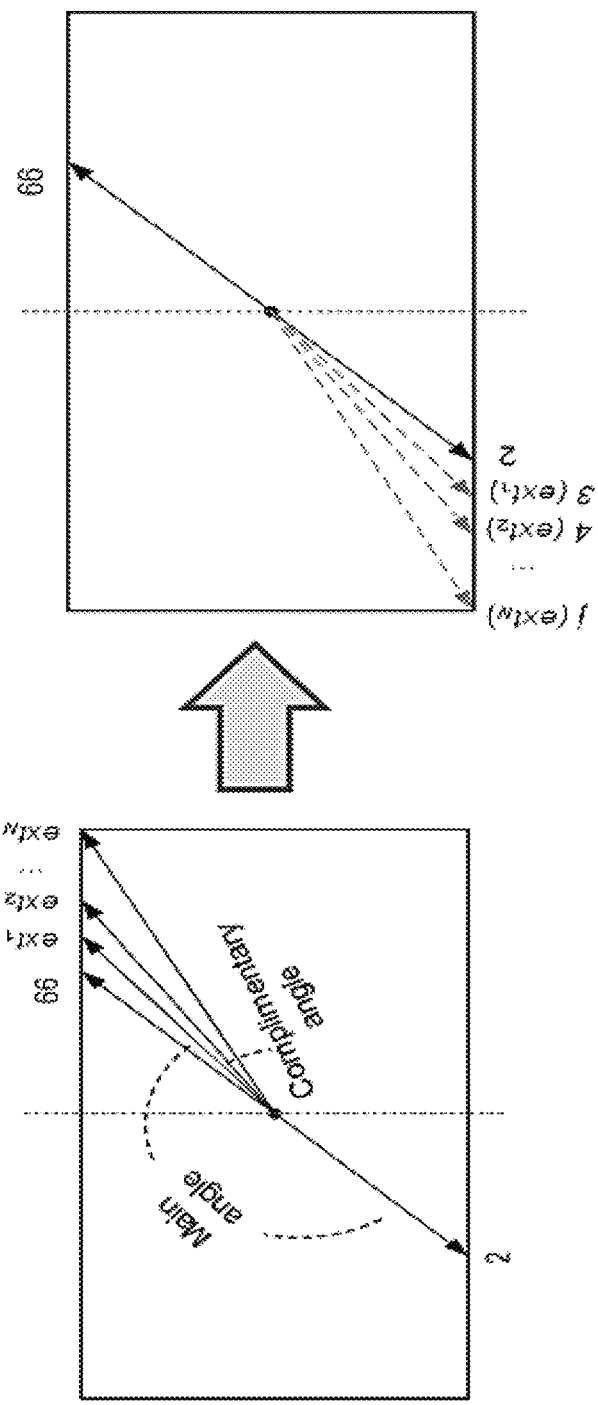
FIG. 13 illustrates a first step of a signaling mechanism for extension of directional intra-prediction modes.

FIG. 13 illustrates a first step of a signaling mechanism for extension of directional intra-prediction modes, wherein a set of extended modes is mapped to a conventional set of intra-prediction modes using a mirroring procedure.

Figure 14:
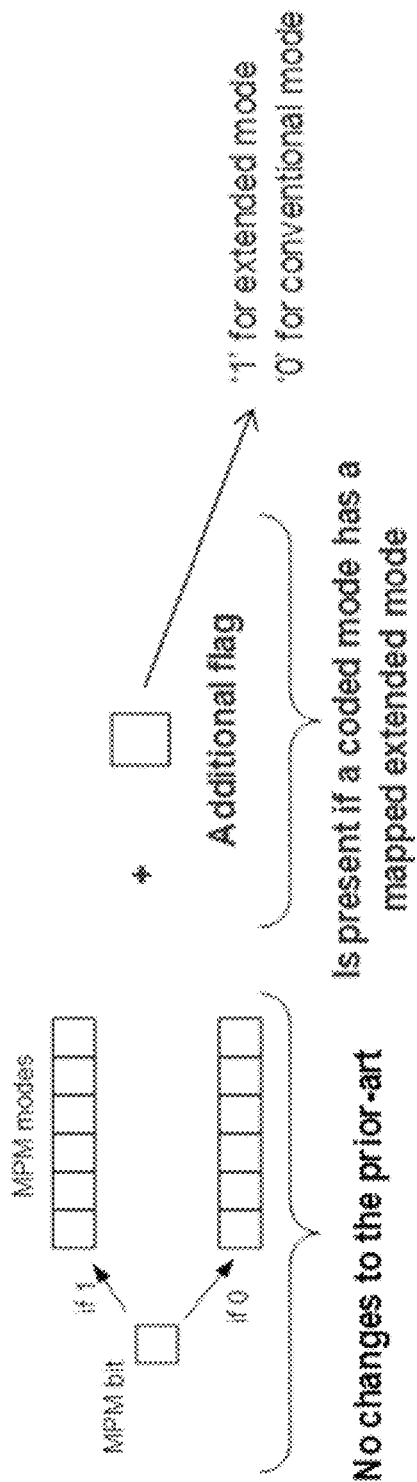
FIG. 14 illustrates a second step of a signaling mechanism for extension of directional intra-prediction modes.

FIG. 14 illustrates a second step of a signaling mechanism for extension of directional intra-prediction modes, wherein in a one-bit flag is used to distinguish between conventional and extended directional modes. The flag is assigned a value "0" for a conventional mode and "1" for an extended mode. Furthermore, the flag in the signaling mechanism is used only for those directional modes that are reflections of extended ones.

Figure 15:
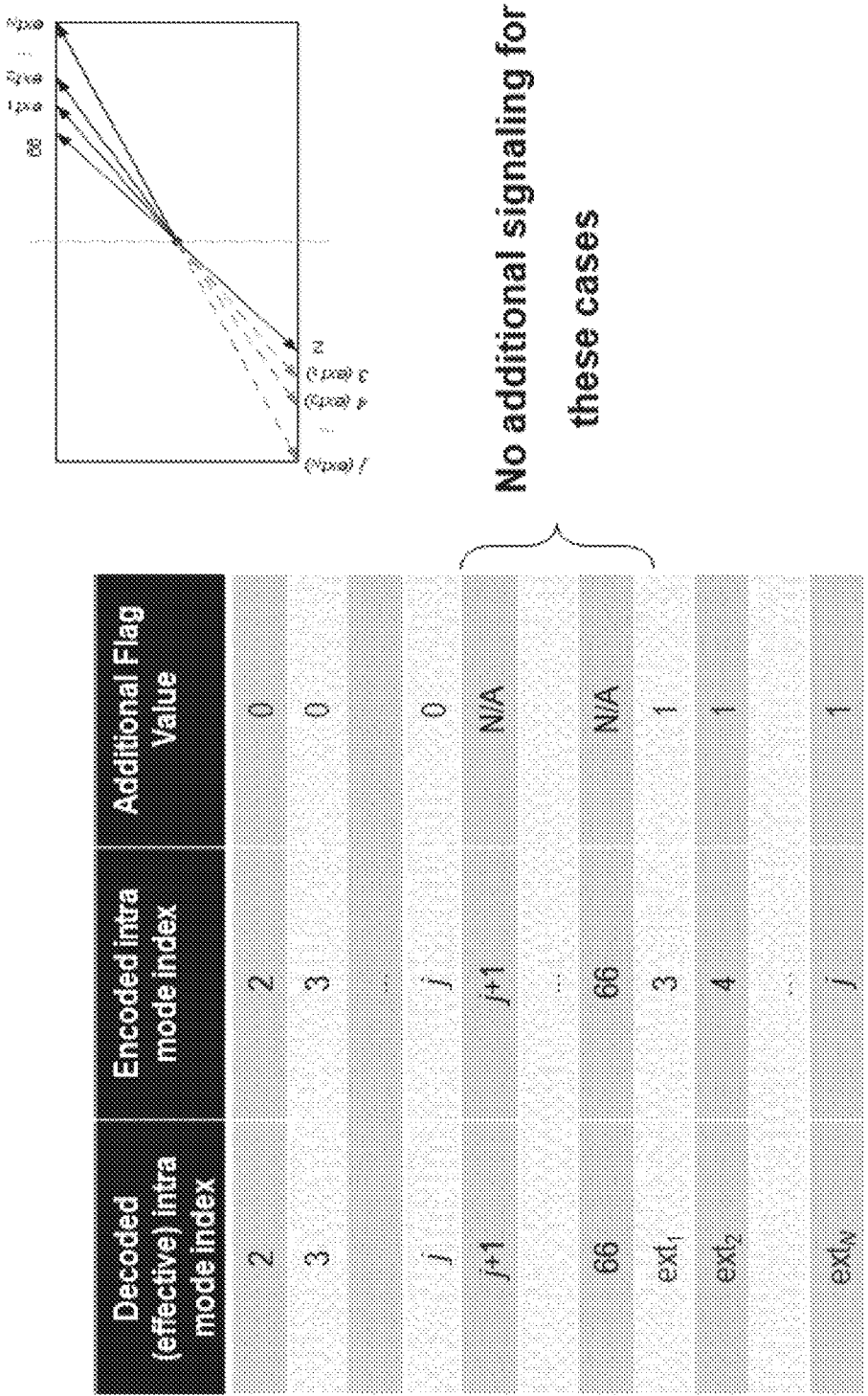
FIG. 15 illustrates a decoding process for a directional intra mode index by applying a signaling mechanism.

FIG. 15 illustrates a decoding process for a directional intra mode index by applying a signaling mechanism. As shown in FIG. 15, the extended modes of the directional intra-prediction are flagged with "1", the conventional modes having a mapped mode are flagged with "0", and the other modes have no additional signaling value.

Figure 16:
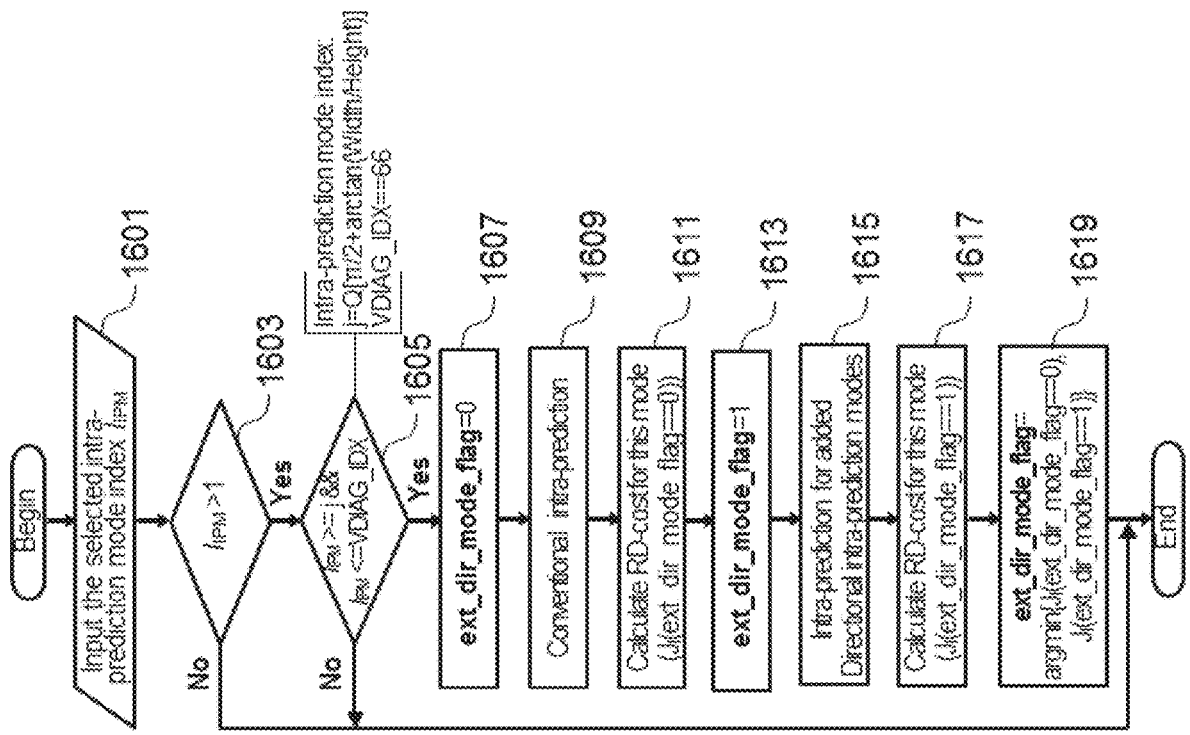
FIG. 16 shows a schematic diagram illustrating an implementation of a signaling mechanism applied in an encoding apparatus.

FIG. 16 shows a schematic diagram illustrating an implementation of a signaling mechanism applied in an encoding apparatus. In a first processing step 1601 the index of the intra-prediction mode $I_{IPM}$ is parsed from the bitstream. Thereafter, in processing step 1603 a decision is taken depending on whether the decoded intra-prediction mode is a directional intra prediction mode. In the case the signaling scheme is applied in the context of HEVC video coding, the intra-prediction mode is directional when $I_{IPM}$ is greater than 1. If the intra-prediction mode is directional, in processing step 1605 a decision is taken depending on whether the decoded intra-prediction mode is extended. The decoded intra-prediction mode is extended when $I_{IPM}$ is greater than Q[π/2+arctan*Width/Height)] and smaller than VDIAG_IDX, wherein Width and Height are the lengths of short and long sides of a rectangular video coding block being decoded, and VDIAG_IDX is equal to 66 according to embodiments of the invention. Then, the flag "ext_dir_mode_flag" is assigned to a value of 0 for the conventional modes which can have mapped extended code (see processing steps 1607, 1609). A rate-distortion cost (RD-cost) is estimated for the conventional modes in processing step 1611. The flag "ext_dir_mode_flag" is assigned to a value of 1 for the extended modes (see processing steps 1613, 1615). A rate-distortion cost (RD-cost) for the conventional modes is estimated in processing step 1617. The flag "ext_dir_mode_flag" is determined by finding the lowest rate-distortion cost (RD-cost) between the conventional modes and extended modes in processing step 1619.

Figure 17:
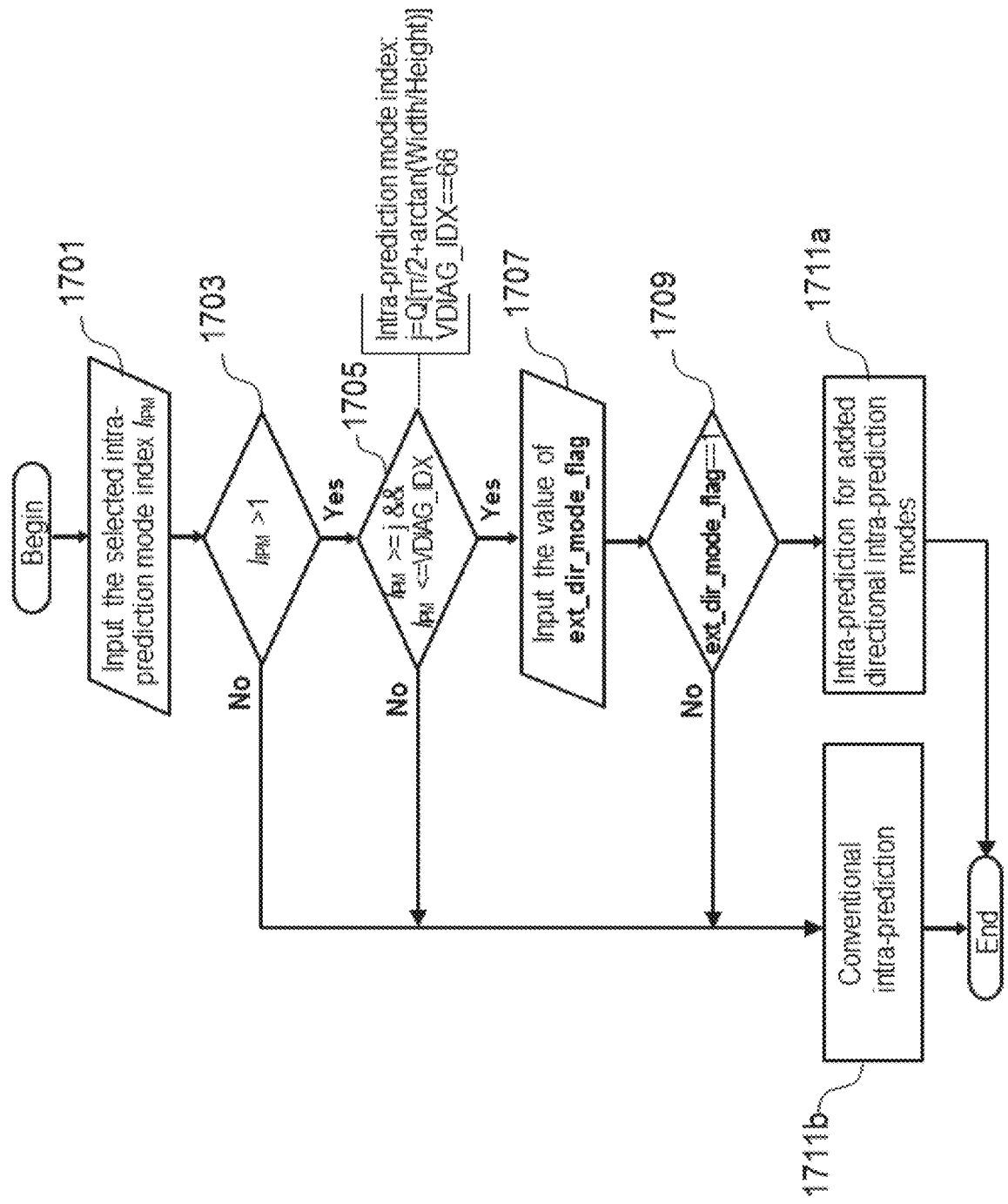
FIG. 17 shows a schematic diagram illustrating an implementation of a signaling mechanism applied in a decoding apparatus.

FIG. 17 shows a schematic diagram illustrating an implementation of a signaling mechanism applied in a decoding apparatus. In a first processing step 1701 the index of the intra-prediction mode $I_{IPM}$ is parsed from the bitstream. Thereafter, in processing step 1703 a decision is taken depending on whether the decoded intra prediction mode is a directional intra prediction mode. In the case the signaling scheme is applied in the context of HEVC video coding, the intra prediction mode is directional when $I_{IPM}$ is greater than 1. If the intra-prediction mode is directional, in processing step 1705 a decision is taken depending on whether the decoded intra-prediction mode is extended. The decoded intra-prediction mode is extended when $I_{IPM}$ is greater than $Q[\pi/2+\arctan(\text{Width}/\text{Height})]$ and smaller than VDIAG_IDX, wherein Width and Height are the lengths of short and long sides of a rectangular block being decoded, and VDIAG_IDX is equal to 66 according to embodiments of the invention. For extended directional intra-prediction modes the value of the flag "ext_dir_mode_flag" is parsed from the bitstream in processing step 1707. According to embodiments of the invention this flag is introduced into the bitstream to code whether to apply the proposed mechanism to the prediction unit. In processing step 1709, a decision is taken to use either the extended prediction scheme if ext_dir_mode_flag is equal to 1 (processing step 1711a) or the conventional prediction if ext_dir_mode_flag is not equal to 1 (processing step 1711b), as provided by embodiments of the invention, for obtaining the predicted signal. The decision in processing step 1709 is taken on the basis of the value of the flag "ext_dir_mode_flag", which has been determined in processing step 1707.

The signaling mechanism is applicable to a wider spectrum of cases according to embodiments of the invention. For examples, it can be used to reduce a signaling overhead caused by an extended set of directional intra-prediction modes used in Enhanced Intra-Prediction (EIP) technique proposed by Google for its VPX codec family. This EIP technique is needed to improve the compression efficiency of intra-predicted blocks within inter-predicted pictures. EIP is a two-pass mechanism for increasing the number of available prediction directions, wherein blocks with good inter-prediction modes are initially encoded, and then intra blocks with access to more boundaries are filled in.

Figure 18:
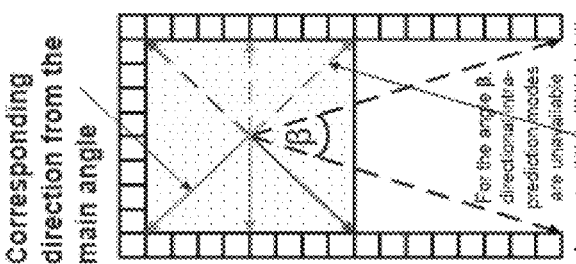
FIGS. 18(a) and 18(b) show schematic diagrams illustrating implementations of a signaling mechanism applied to the Enhanced Intra-Prediction (EIP) mechanism.
Figure 18:
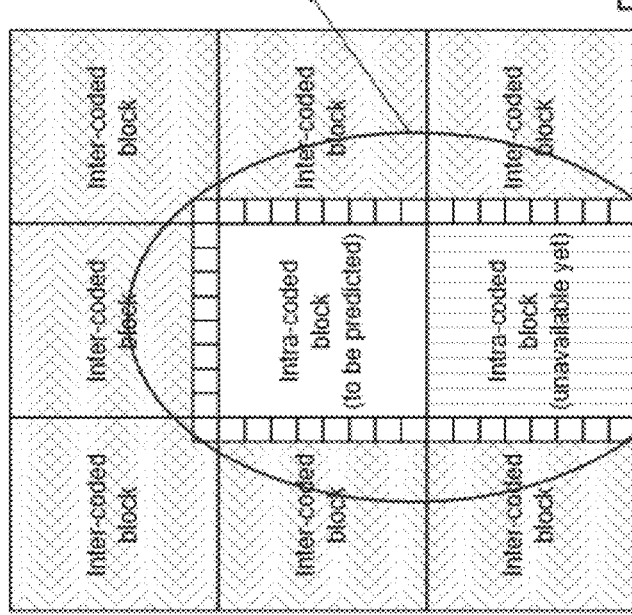
Figure 18:
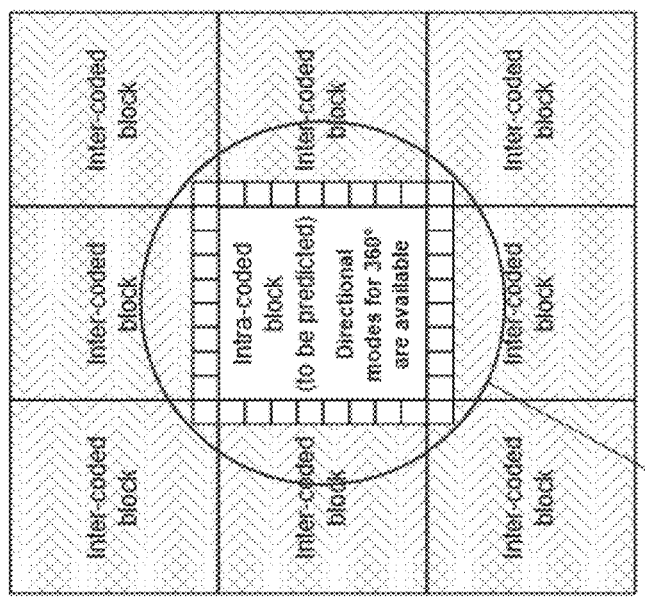

FIGS. 18a and 18b show schematic diagrams illustrating implementations of a signaling mechanism applied to the Enhanced Intra-Prediction (EIP) mechanism. In the cases shown in FIGS. 18a and 18b, 4 (2π) and 3 (3π/2) sides of a video coding block are available for directional intra-prediction, respectively. Solid lines denote directions from a main angle and dashed lines denote directions from a complimentary angle. In both cases, the set of available intra-prediction modes is more than for a conventional case.

As described above, the same 2-step signaling mechanism can be conducted to signal what angle the selected directional intra-prediction mode belongs to by using a one-bit flag. Firstly, a directional mode can be mapped onto the main angle if the directional mode is selected from the complementary angle. Secondly, the one-bit flag can be set to "ON" if the direction is selected from the complementary angle; otherwise, the flag can be set to "OFF".

Figure 19:
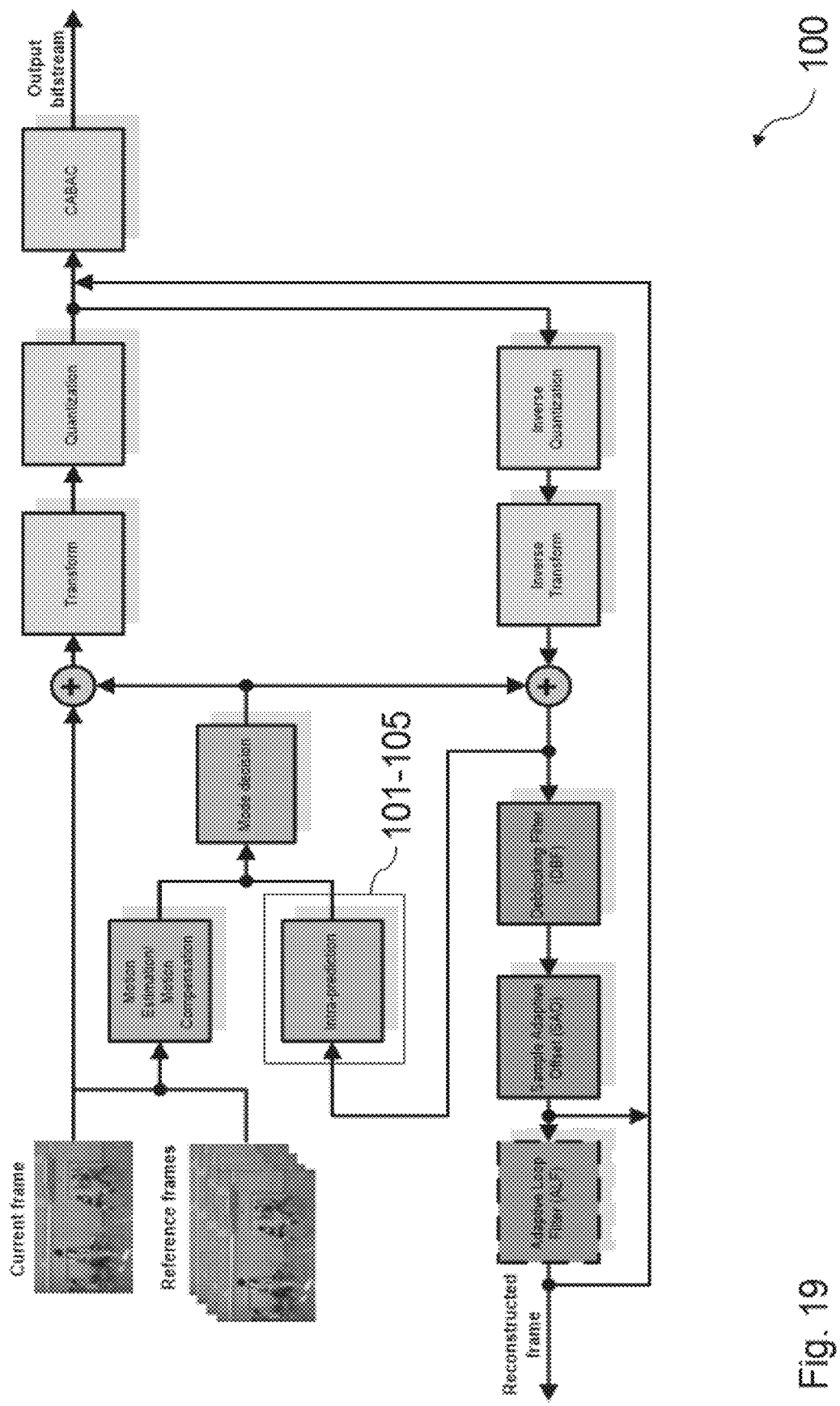
FIG. 19 shows a schematic diagram of an encoding apparatus comprising a mode mapping unit, a signaling unit, and an intra-prediction unit.

FIG. 19 shows a schematic diagram of an encoding apparatus 100 comprising a mode mapping unit 101, a signaling unit 103, and an intra-prediction unit 105. A decoding apparatus 200 can be implemented analogously.

While a particular feature or aspect of the disclosure may have been disclosed with respect to only one of several implementations or embodiments, such a feature or aspect may be combined with one or more further features or aspects of the other implementations or embodiments as may be desired or advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives thereof may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of embodiments of the invention beyond those described herein. While embodiments of the present invention have been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

The invention claimed is:

1. An encoding apparatus for encoding a rectangular video coding block, the encoding apparatus being configured to signal an extension directional intra-prediction mode within a set of directional intra-prediction modes using a signaling indicator, the set of directional intra-prediction modes comprising predetermined directional intra-prediction modes and the extension directional intra-prediction mode, wherein the extension directional intra-prediction mode is an additional directional intra-prediction mode extending beyond a direction of a diagonal of a square video coding block, the encoding apparatus comprising:

a processor; and a memory storing instructions that when executed by the processor configure the encoding apparatus to perform steps comprising:

selecting a predetermined directional intra-prediction mode from the set of directional intra-prediction modes in dependence of the extension directional intra-prediction mode, the selected predetermined directional intra-prediction mode being associated with an intra mode index, and to map the extension directional intra-prediction mode onto the selected predetermined directional intra-prediction mode;

generating the signaling indicator comprising at least one of the intra mode index and a flag value, the flag value indicating the mapping of the extension directional intra-prediction mode onto the selected predetermined directional intra-prediction mode, wherein the flag value is used when the intra mode index is associated with the extension directional intra-prediction mode, and to associate the signaling indicator with the extension directional intra-prediction mode;

intra-predicting pixel values of pixels of the rectangular video coding block based on the extension directional intra-prediction mode associated with the signaling indicator for providing a predicted rectangular video coding block; and encoding the rectangular video coding block based on the predicted rectangular video coding block.

2. The encoding apparatus of claim 1, wherein each predetermined directional intra-prediction mode is associated with a predetermined direction within a predetermined directional range, wherein the extension directional intra-prediction mode is associated with a complementary direction within a complementary directional range, and wherein the directional range is different from the predetermined directional range.

3. The encoding apparatus of claim 2, wherein the complementary direction of the extension directional intra-prediction mode is opposite to the predetermined direction of the selected predetermined directional intra-prediction mode.

4. The encoding apparatus of claim 2, wherein the complementary directional range and the predetermined directional range are adjacent.

5. The encoding apparatus of claim 1, wherein the flag value is a binary value.

6. The encoding apparatus of claim 1, wherein the signaling indicator comprises a most-probable-mode indicator.

7. The encoding apparatus of claim 1, wherein the rectangular video coding block is a coding unit, a prediction unit, or a transform unit.

8. A decoding apparatus for decoding an encoded rectangular video coding block, the decoding apparatus being configured to handle a signaling indicator associated with an extension directional intra-prediction mode, wherein the extension directional intra-prediction mode is an additional intra-prediction mode extending beyond a direction of a diagonal of a square video coding block, the signaling indicator comprising an intra mode index, the intra mode index being associated with a predetermined directional intra-prediction mode, the decoding apparatus comprising:
    a processor; and
    a memory storing instructions that when executed by the processor configure the decoding apparatus to perform steps comprising:
    intra-predicting pixel values of pixels of the encoded rectangular video coding block based on the extension directional intra-prediction mode associated with the signaling indicator for providing a predicted rectangular video coding block; and
    restoring a rectangular video coding block based on the predicted rectangular video coding block.

9. The decoding apparatus of claim 8, wherein the signaling indicator further comprises a flag value, the flag value indicating a mapping of the extension directional intra-prediction mode onto the predetermined directional intra-prediction mode, wherein the flag value is used when the intra mode index is associated with the extension directional intra-prediction mode.

10. An encoding method for encoding a rectangular video coding block, the encoding method being configured to signal an extension directional intra-prediction mode within a set of directional intra-prediction modes using a signaling indicator, the set of directional intra-prediction modes comprising predetermined directional intra-prediction modes and the extension directional intra-prediction mode, wherein the extension directional intra-prediction mode is an additional intra-prediction mode extending beyond a direction of a diagonal of a square video coding block, the encoding method comprising:
    selecting a predetermined directional intra-prediction mode from the set of directional intra-prediction modes in dependence of the extension directional intra-prediction mode, the selected predetermined directional intra-prediction mode being associated with an intra mode index;
    mapping the extension directional intra-prediction mode onto the selected predetermined directional intra-prediction mode;
    generating the signaling indicator comprising at least one of the intra mode index and a flag value, the flag value indicating the mapping of the extension directional intra-prediction mode onto the selected predetermined directional intra-prediction mode, wherein the flag value is used when the intra mode index is associated with the extension directional intra-prediction mode;
    associating the signaling indicator with the extension directional intra-prediction mode;
    intra-predicting pixel values of pixels of the rectangular video coding block on the basis of the extension directional intra-prediction mode associated with the signaling indicator for providing a predicted rectangular video coding block; and
    encoding the rectangular video coding block on the basis of the predicted rectangular video coding block.

11. A decoding method for decoding an encoded rectangular video coding block, the decoding method being configured to handle a signaling indicator associated with an extension directional intra-prediction mode, the signaling indicator comprising an intra mode index, the intra mode index being associated with a predetermined directional intra-prediction mode, wherein the extension directional intra-prediction mode is an additional intra-prediction mode extending beyond a direction of a diagonal of a square video coding block, the decoding method comprising:
    intra-predicting pixel values of pixels of the encoded rectangular video coding block based on the extension directional intra-prediction mode associated with the signaling indicator for providing a predicted rectangular video coding block; and
    restoring a rectangular video coding block based on the predicted rectangular video coding block.

12. The decoding method of claim 11, wherein the signaling indicator further comprises a flag value, the flag value indicating a mapping of the extension directional intra-prediction mode onto the predetermined directional intra-prediction mode, wherein the flag value is used when the intra mode index is associated with the extension directional intra-prediction mode.

13. A non-transitory computer readable medium for encoding a rectangular video coding block, the non-transitory computer readable medium storing instructions to signal an extension directional intra-prediction mode within a set of directional intra-prediction modes using a signaling indicator, the set of directional intra-prediction modes comprising predetermined directional intra-prediction modes and the extension directional intra-prediction mode, wherein the extension directional intra-prediction mode is an additional directional intra-prediction mode extending beyond a direction of a diagonal of a square video coding block, and when the instructions are executed by a computer, the computer is configured to perform steps comprising:

selecting a predetermined directional intra-prediction mode from the set of directional intra-prediction modes in dependence of the extension directional intra-prediction mode, the selected predetermined directional intra-prediction mode being associated with an intra mode index;

mapping the extension directional intra-prediction mode onto the selected predetermined directional intra-prediction mode;

generating the signaling indicator comprising at least one of the intra mode index and a flag value, the flag value indicating the mapping of the extension directional intra-prediction mode onto the selected predetermined directional intra-prediction mode, wherein the flag value is used when the intra mode index is associated with the extension directional intra-prediction mode;

associating the signaling indicator with the extension directional intra-prediction mode;

intra-predicting pixel values of pixels of the rectangular video coding block based on the extension directional intra-prediction mode associated with the signaling indicator for providing a predicted rectangular video coding block; and encoding the rectangular video coding block based on the predicted rectangular video coding block.

14. A non-transitory computer readable medium for decoding an encoded rectangular video coding block, the non-transitory computer readable medium storing instructions to handle a signaling indicator associated with an extension directional intra-prediction mode, the signaling indicator comprising an intra mode index, the intra mode index being associated with a predetermined directional intra-prediction mode, wherein the extension directional intra-prediction mode is an additional directional intra-prediction mode extending beyond a direction of a diagonal of a square video coding block, and when the instructions are executed by a computer, the computer is configured to perform steps comprising:

intra-predicting pixel values of pixels of the encoded rectangular video coding block based on the extension directional intra-prediction mode associated with the signaling indicator for providing a predicted rectangular video coding block; and restoring a rectangular video coding block based on the predicted rectangular video coding block.

* * * * *